US006206372B1

(12) United States Patent
Harris

(10) Patent No.: US 6,206,372 B1
(45) Date of Patent: Mar. 27, 2001

(54) MAGIC SQUARES GAME

(76) Inventor: Richard Lionel Harris, HCR3 Box 490, Deer River, MN (US) 56636

( * ) Notice: Subject to any disclaimer, the term of this patent is extended or adjusted under 35 U.S.C. 154(b) by 0 days.

(21) Appl. No.: 09/153,743

(22) Filed: Sep. 15, 1998

(51) Int. Cl.[7] .............................. A63F 9/08; G09B 19/02

(52) U.S. Cl. .............................. 273/153 S; 273/153 R; 273/271; 434/188; 434/191; 434/201; 434/207

(58) Field of Search .............................. 434/188, 191, 434/200, 201, 207; 273/156, 153 S, 153 R, 271, 267

(56) References Cited

U.S. PATENT DOCUMENTS

| | | | | |
|---|---|---|---|---|
| 2,654,963 | * | 10/1953 | Van Dijck . | |
| 3,189,350 | * | 6/1965 | Hopkins . | |
| 4,128,243 | * | 12/1978 | Pulejo | 273/156 |
| 4,138,115 | * | 2/1979 | Gans | 273/153 R |
| 4,445,865 | * | 5/1984 | Sellon . | |
| 4,494,756 | * | 1/1985 | Winer | 273/156 |
| 4,593,907 | * | 6/1986 | Abu-Shimays | 273/153 S |
| 4,687,207 | * | 8/1987 | Darling | 273/271 |
| 4,863,172 | * | 9/1989 | Rosenwinkel | 273/153 S |
| 5,018,976 | * | 5/1991 | Kuyath . | |
| 5,156,548 | * | 10/1992 | Grafflage . | |
| 5,219,289 | * | 6/1993 | Derr . | |
| 5,643,084 | * | 7/1997 | Mirsky | 463/9 |
| 5,944,605 | * | 8/1999 | Pajitnov | 463/9 |

OTHER PUBLICATIONS

Mutsumi Suzuki, Ultra Super Magic Squares of 5 ×5, http://www/pse.che.tohku.ac.jp/~msuzuki/MagicSquare.5×5.selfsim.html, Sep. 1997.*

W.S. Andrews, Magic Squares and Cubes 248–57 (Dover Publications 1960) (1917).*

William H. Benson, Oswald Jacoby, New Recreations with Magic Squares 12–18 (Dover Publications 1976).*

* cited by examiner

*Primary Examiner*—Robert A. Hafer
*Assistant Examiner*—Kent Fernstrom
(74) *Attorney, Agent, or Firm*—Merchant & Gould P.C.

(57) ABSTRACT

An educational and recreational apparatus and method having a background grid defining a matrix having a plurality of individual cells, and a plurality of elements each having a first surface, with indicia disposed thereon, said elements being removably disposable on said grid. Each arrangement of said elements disposed on said grid define a magic square, so that each row, column, or diagonal of the magic square is characterized by a defined relationship in accordance with the indicia. A method of manipulating said elements, said method having at least one computer, display device, calculation means, input device and data storage device. The method including displaying a grid defining a matrix on said display device, arranging said elements on said grid using said input device for selecting and inserting said elements therein, manipulating said elements on said grid using said input device and forming a magic square on said matrix by arranging said elements.

34 Claims, 21 Drawing Sheets

(21 of 21 Drawing Sheet(s) Filed in Color)

FIG. 14

MAGIC SQUARES GAME

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office, patent file, or records, but otherwise reserves all copyright rights whatsoever.

1. Field of the Invention

This invention relates to educational and recreational devices and more particularly to a method for effecting solutions to magic squares.

2. Description of Related Art

Magic squares have fascinated mankind for hundreds, perhaps thousands, of years. In its simplest form, a magic square is an arrangement of numbers in a square grid such that the numbers in each horizontal row, each vertical column, and the two principal diagonals add up to the same total. In more advanced magic squares, the magic total occurs in many additional patterns.

Some magic squares, whose numbers were related to natural phenomena, such as days or years, historical or religious events, were given mystical meanings. Other magic squares are awesome by their sheer size, there being no limit to how many numbers can be included in a magic square.

Thus, the present invention provides an improved method for effecting solutions to magic squares as well as an opportunity for competition between two or more parties.

SUMMARY OF THE INVENTION

The present invention relates to an educational and recreational device and more particularly to methods for effecting solutions to magic squares and for changing one magic square into another specified magic square.

In one embodiment the present invention provides an educational and recreational apparatus, comprising a background grid defining a matrix having a plurality of individual cells; and a plurality of elements each having a first surface, with indicia disposed thereon, said elements being removably disposable on said grid, whereby an arrangement of said elements disposed on said grid define a magic square, so that rows, columns, diagonals and other patterns of the magic square are characterized by a defined relationship in accordance with said indicia.

In another embodiment the present invention provides a method of manipulating elements arranged in a grid defining a matrix, each of said elements having a first surface with indicia disposed thereon, said elements being removably disposable on said matrix, the method comprising; arranging said elements on said grid, manipulating said elements on said grid, and forming a magic square on said grid in accordance with said indicia disposed on said elements, whereby said magic square is characterized by a defined relationship in accordance with said indicia.

Further in another embodiment the present invention provides a method of manipulating elements arranged in a grid defining a matrix having, each of said elements having a first surface with indicia disposed thereon, said elements being removably disposable on said grid, said method including at least one computer, display device, calculation means, input device and data storage device, the method comprising; displaying a grid defining a matrix on said display device, arranging said elements on said grid using said input device to select and insert said elements therein, manipulating said elements on said grid using said input device, and forming a magic square on said matrix by arranging said elements.

In yet another embodiment the present invention provides a computer program embodied on a computer-readable medium for implementing a magic squares computer game designed for play on at least one computer system having at least one display, at least one input device, and at least one data storage device, comprising an executable code segment operable by at least one said computer system.

The present invention also provides for simultaneous participation in competition on remotely connected computers with or without a centralized control, and potentially involving vast numbers of computers interconnected via networks or Internet.

The present invention also provides a teaching device for schools for the purpose of instruction or competition.

These are but some of the many embodiments in accordance with the principles of the present invention.

These and various other advantages of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Referring now to the drawings in which like reference numbers represent corresponding parts throughout.

DETAILED DESCRIPTION OF THE PREFERRED EMBODIMENT

One embodiment of a computerized version of the present invention is a magic squares computer program which is designed to operate on a Windows 3.1 system or more advanced compatible systems. Its purpose is to provide a visual board to construct and manipulate 5×5 magic squares, utilizing the integers, 1–25, according to a defined relationship whereby the integers located in each row, column, major diagonal and other geometric patterns add up to the integer 65 in accordance with the principles of magic squares. These principles and other embodiments in accordance with the present invention are further explained in the text incorporated by reference and attached hereto in its entirety as Appendix A.

Changing what has been largely an individual pastime into a competitive game, the various embodiments of the present invention have introduced several additional factors, not limited to the computerized embodiment. Colored number squares are used to speed up recognition of individual numbers and to allow players to identify significant patterns. Time bonuses and penalties reward superior performances and penalize substandard ones. The use of Megabucks as a scoring medium provides a symbolism readily understood in all cultures. Adoption of a versatile but carefully designed magic square gives a fascinating and totally fair playing field. Though the element of dexterity exists in both board and computer games, the overriding requirement is the ability to reason quickly and accurately and to maintain concentration. Replacement of numbers with letters, names or symbols in other versions, provides a refreshing alternative for those not fully comfortable with numbers, as well as a new challenge for everyone.

Shown in the figures is the applicant's trademark for the game, namely MAJI SKWARES.

Figure 1:
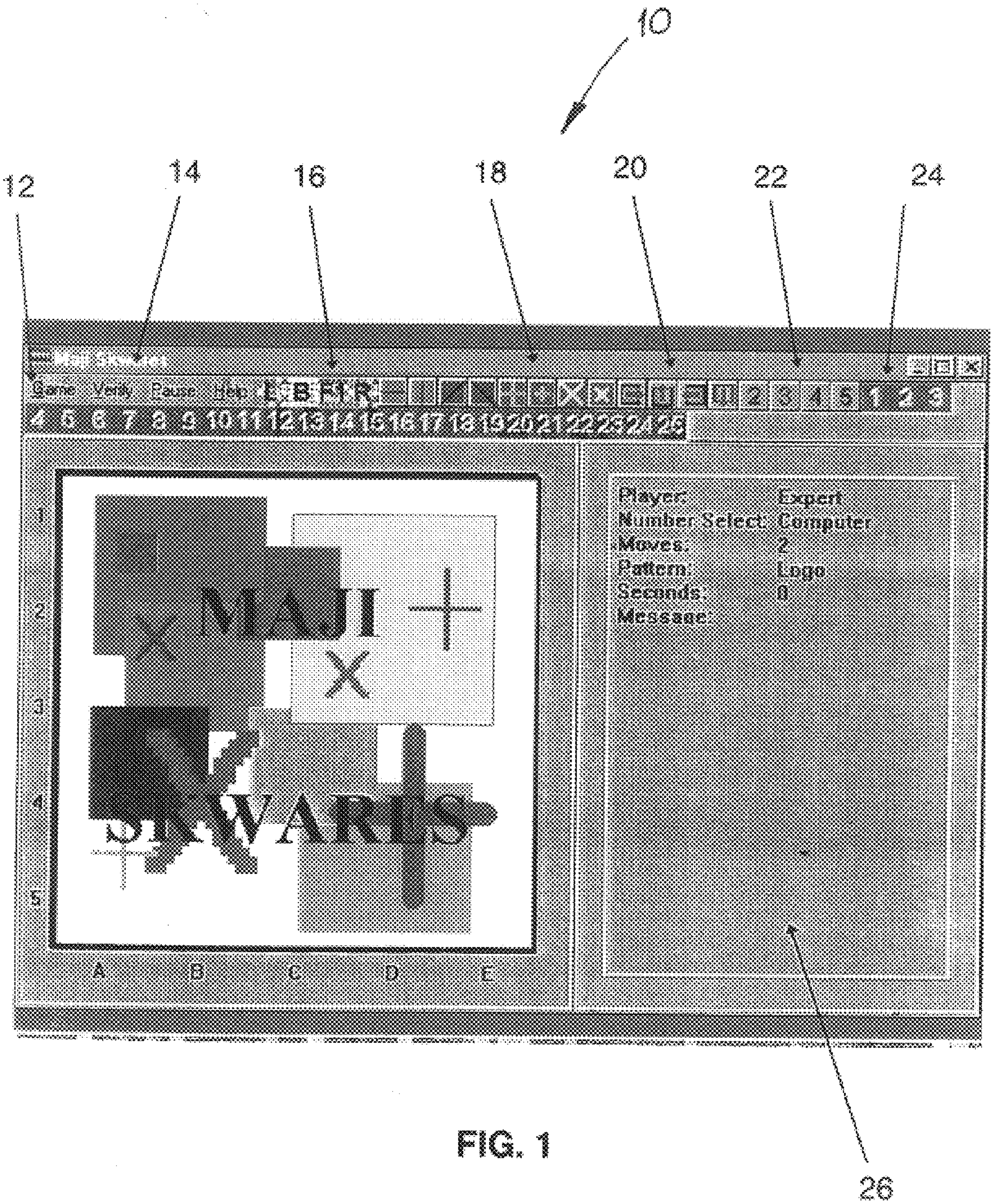
FIG. 1 illustrates an opening screen that appears in one embodiment of a program of the computerized version of magic squares in accordance with the principles of the present invention.

FIG. 1 illustrates an opening screen 10 of the computerized version of the magic squares game. A toolbar 12 displays an arrangement of menu options and tools for playing the game. A series of pull down menus 14 allows a player to select various game options, verify that a current magic square is valid, pause the clock and choose help for instructions.

Initial patterns may be initiated by the computer by selecting one of four pattern generator 16 tool bars.

In addition, a player may select one of eight computer generated standard patterns 18 as follows: horizontal, vertical, northeast diagonal, southeast diagonal, large cross, small cross, large diagonal cross and small diagonal cross, whereby each pattern is a subset of a valid magic square.

Translation of a magic square, or any subset thereof, may be effected to the right, up, to the left or downward by using the translation tool bars 20. It is appreciated that each time the magic square is translated in any direction the properties of the magic square are maintained.

A number switch option tool bar 22 allows a player to select one of four number switch options.

Integers 1–25, selected from the number tool bar 24, are the numbers to be inserted in the grid to form a magic square. It is appreciated that non-integer numbers, geometric figures, animals, trees, fruits, cars and many other additional indicia may be used as representative elements to form the magic square. The use of small and large versions of the same symbol to represent player and team numbers is also particularly useful. Symbols should be easily recognized and readily distinguished one from another. The same consideration should be used if letters or names are used in place of numbers.

A computer screen display area 26 provides current game settings and status, such as player skill level, number select, number switch option, selected pattern, elapsed time in seconds and any messages from the computer.

Figure 2:
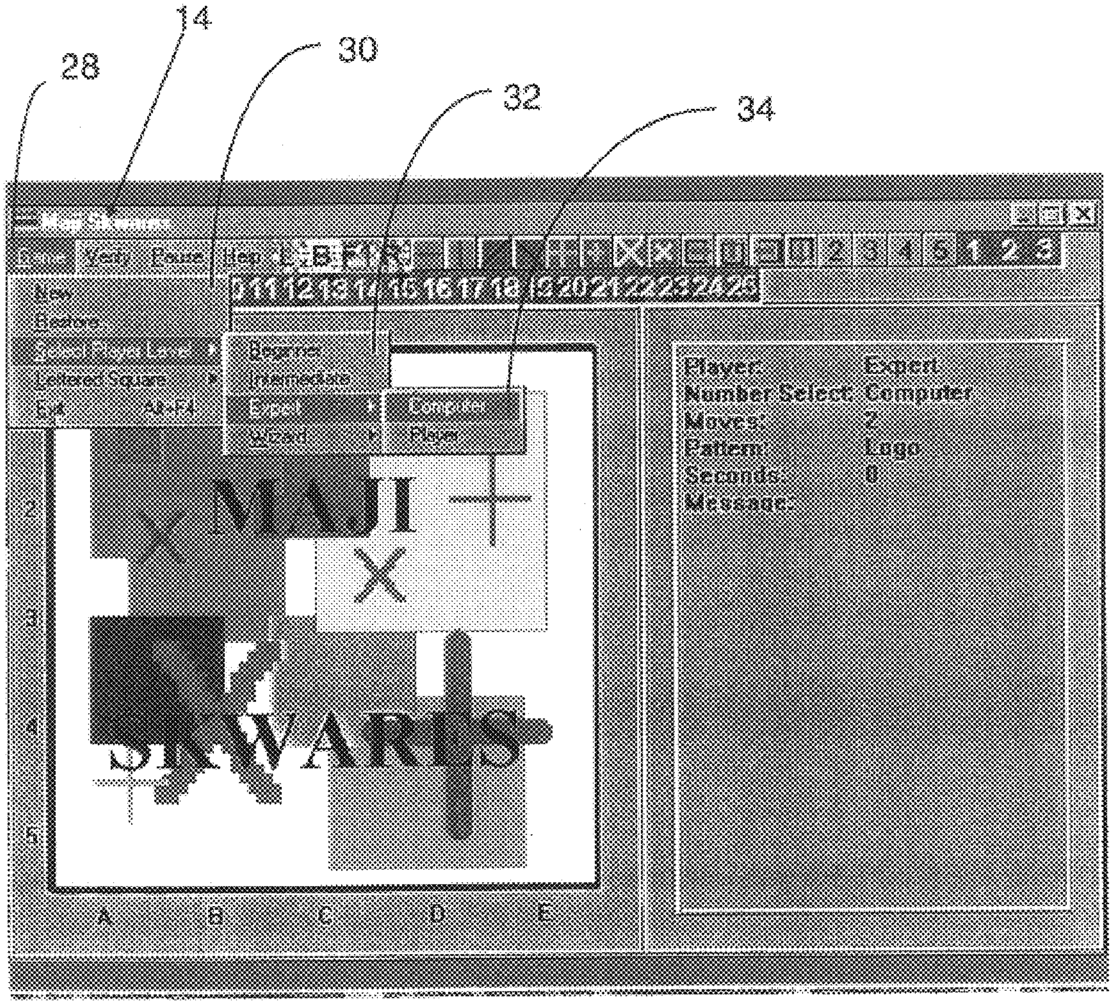
FIG. 2 illustrates a series of pull down menus for the selection of game options.

As illustrated in FIG. 2 a pull down menu tool bar 14 allows a player to select game options by selecting the game tool bar 28. Game menu 30 allows a player to select one of the following options for a new game, restore a previous game, select a player level of specified difficulty, select a lettered square (whereby an additional letter is displayed in the lower left corner of each grid element of the matrix) and exit.

Choosing the select player level option opens an additional sub-menu 32 to allow a player to choose beginner, intermediate, expert or wizard levels of play. Beginner level players are given easier assignments by the computer and are allowed to choose numbers from a completed display. Intermediate level players are given somewhat more difficult assignments, though still allowed to choose numbers in the preferred order. Expert level players are given the most difficult assignments and may be compelled, by selecting the computer option in sub-menu 34, to use numbers randomly supplied by the computer. In the wizard category, a player must complete the assignment with uncolored numbers, thus requiring the player to remember the color associated with each number. An wizard player also must use the expert assignments, and randomly supplied numbers if the computer option was previously selected at sub-menu 34. The colors are restored when verification is effected.

Figure 3:
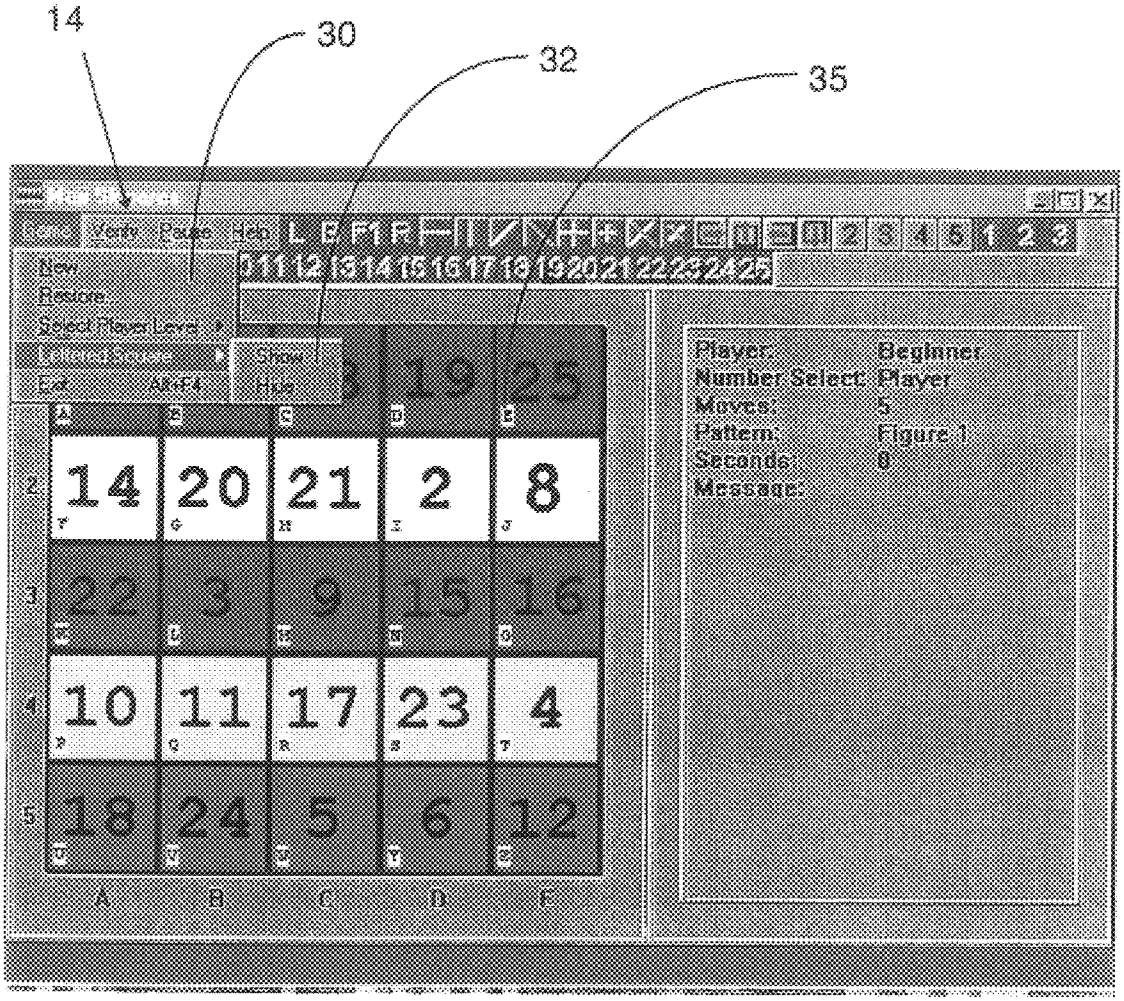
FIG. 3 illustrates a pull down menu to activate a lettered square option of the magic squares game.

FIG. 3 illustrates the lettered square option from the pull down menu tool bar 14. Lettered square option is selected at sub-menu 30 and a show/hide feature may be enabled at sub-menu 32. A letter 35 corresponding to a grid element is displayed in its lower left corner. The letters A through Z (Except X) are for use in the cryptogram version of the game.

Figure 4:
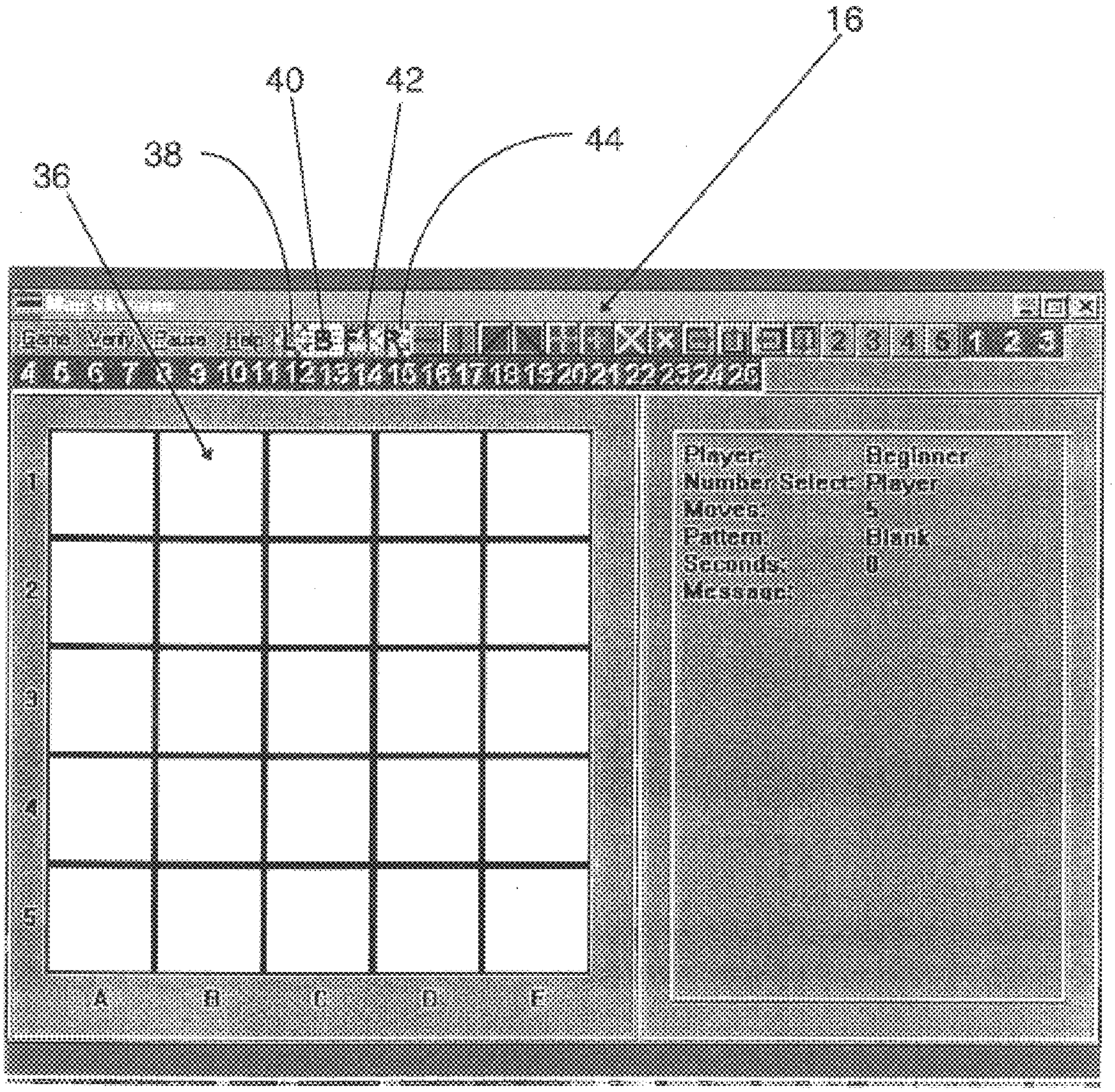
FIG. 4 illustrates a blank grid display of the computerized version of magic squares.

FIG. 4 illustrates a blank 5×5 grid 36 that is provided at the beginning of a new game by selecting the "B" option 40 from the pattern generator tool bar 16. Numbers that are selected from a displayed array of 25 integers are inserted or extracted from the grid by utilizing a mouse. However, it is appreciated that other input devices may be utilized to select, insert and extract numbers to form a magic square in the grid. Other options include "L" 38 for highlighting the integers 1–25, "F1" 42 for automatically filling the grid with a predefined magic square and "R" 44 for randomly filling the grid with the integers 1–25 that do not necessarily define a magic square.

Figure 5:
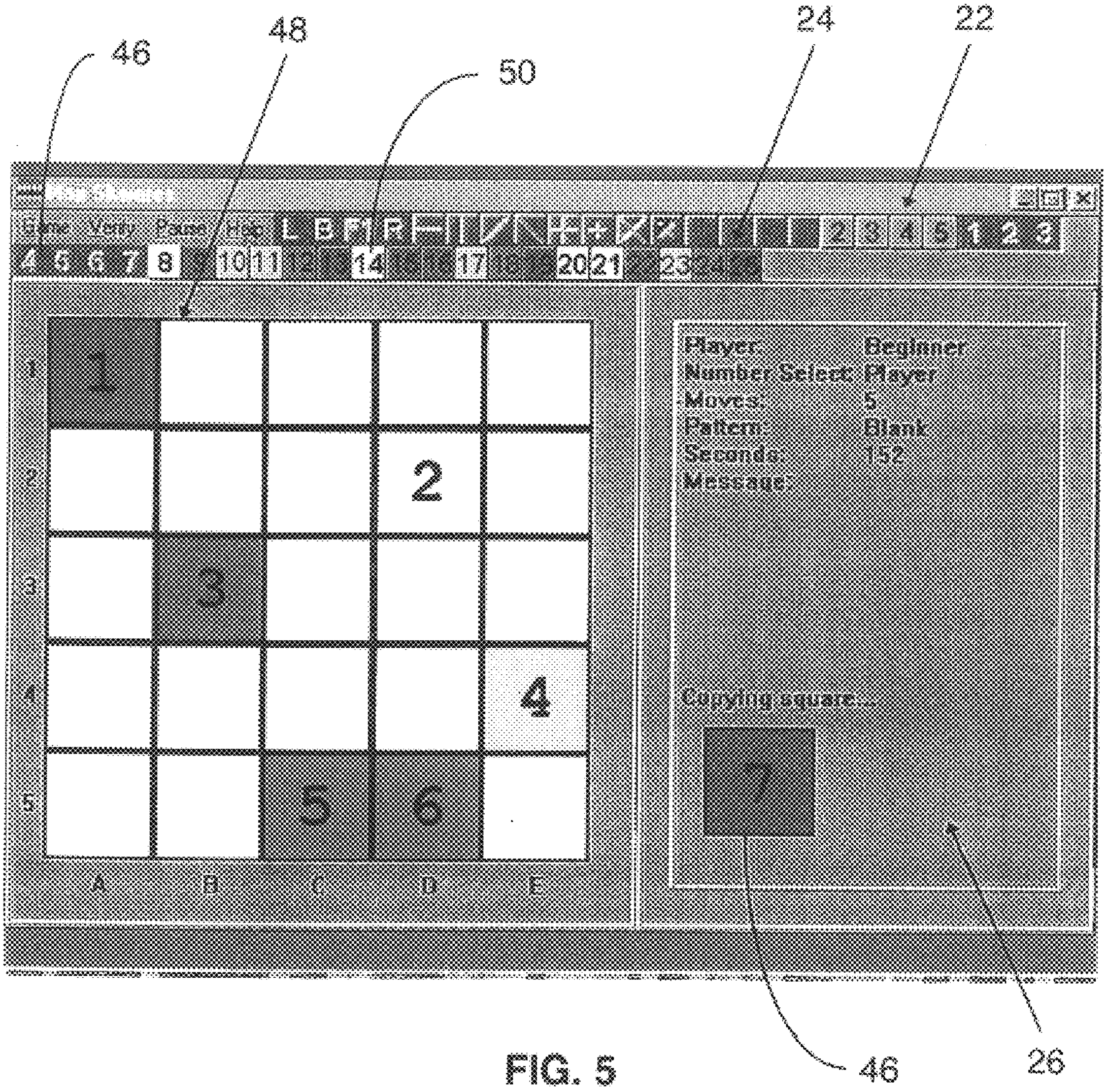
FIG. 5 illustrates a magic squares in progress with an initial assembly of integers 1–6 in a magic square background grid.

FIG. 5 illustrates a partially filled grid 46 of a magic square game in progress. A player may select any number 24 from 1–25 not already placed in the grid; or, optionally, the computer may be instructed to randomly select the next number to be placed in the grid by highlighting and selecting a specified tool bar. A number 60 (either selected by the player or the computer) is initially displayed beside the grid in the game status screen display area 26 and it is subsequently placed in an unoccupied space in the grid by pointing and actuating the mouse button on the unoccupied space. Only numbers which remain lighted 50 in the tool bar display area are available to be placed in the grid. Numbers already placed in the grid are de-emphasized 48 in the tool bar display area by turning off the highlighting feature. If the number is extracted from the grid it is again displayed as being available in the tool bar display area.

The numbers are enclosed in colored squares, identical with the coloring system for the vertically disposed team board and table top games. These squares fit the squares in the grid as shown in the partially completed grid 48.

An additional feature of the computer game program of the preferred embodiment of the present invention is the option to select a number switch option from the number switch option tool bar 22 to set the computer for 2-number, 3-number, 4-number or 5-number switches in the completed grid. These switches are an integral part of the magic squares games and allow a player to interchange two numbers; interchange three numbers in the order specified by the player utilizing the mouse; interchange four numbers in the order specified by the player utilizing the mouse or; interchange five numbers in the order specified by the player utilizing the mouse.

As shown in FIGS. 6–13, pattern tool bars 18 enable the computer to fill in one of eight 5 number combinations having the magic square properties in the magic square grid. These patterns include: horizontal (H) 54 (FIG. 6), vertical (V) 60 (FIG. 7), northeast diagonal (NE) 62 (FIG. 8), southeast diagonal (SE) 66 (FIG. 9), large cross (✠) 70 (FIG. 10), small cross (+) 74 (FIG. 11), large diagonal cross (large 'X') 78 (FIG. 12) or a small diagonal cross (small 'x') 82 (FIG. 13) to supply the start of one of the basic magic squares games, completing a specified magic square. When located anywhere in the grid each of these patterns defines one and only one magic square.

Upon activating one of the pattern tool bars 18, the computer randomly selects the numbers and location of the specified pattern and places it in the grid. The selections by the computer are influenced by whether beginner, intermediate, expert or wizard player level options are being used.

Figure 6:
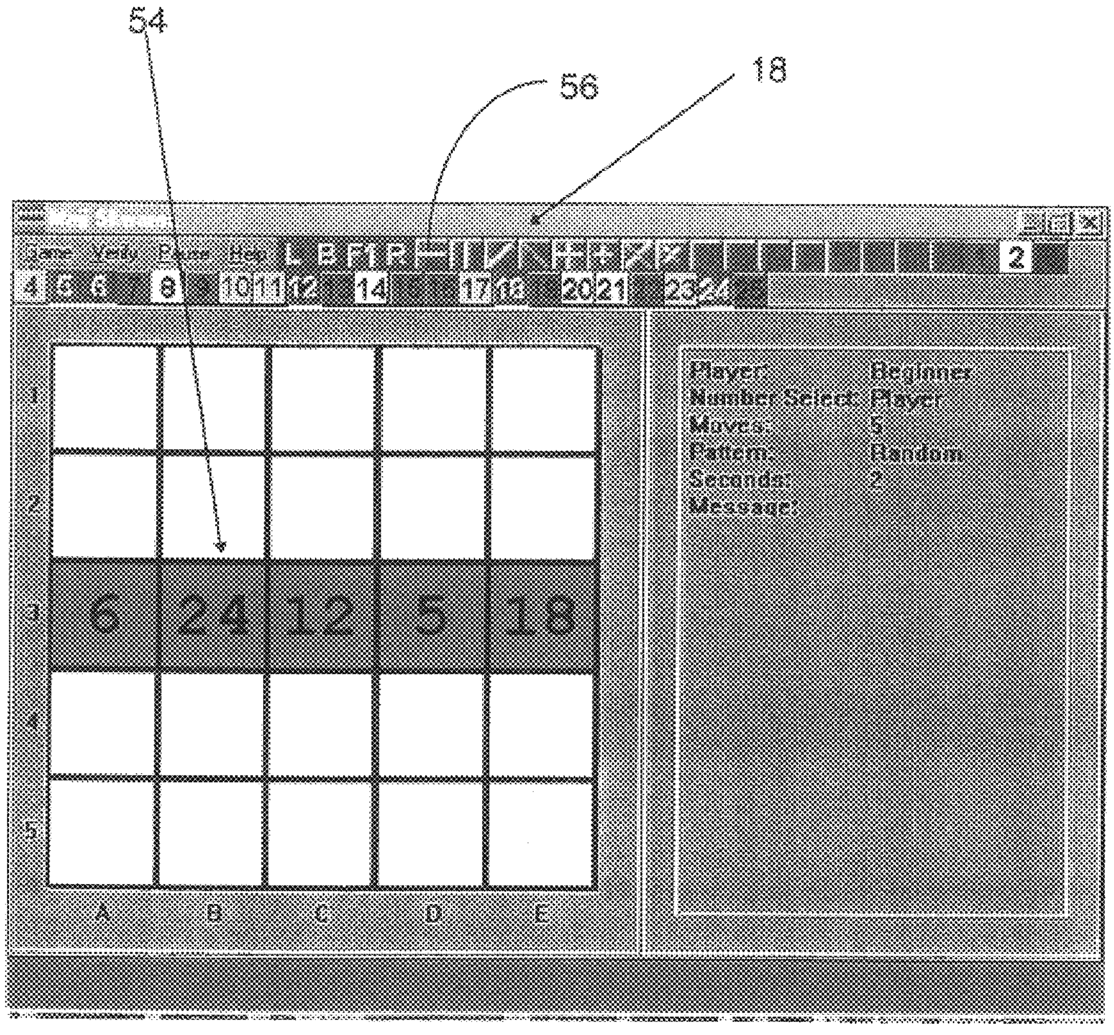
FIG. 6 illustrates a horizontal pattern having a magic square property, whereby the total of any row, column, major diagonal among other patterns defined within the magic square adds up to 65.

At FIG. 6, selecting the horizontal tool bar 56 from the pattern tool bars 18, generates a horizontal pattern 54 which is a starting point of one of the basic magic squares.

Figure 7:
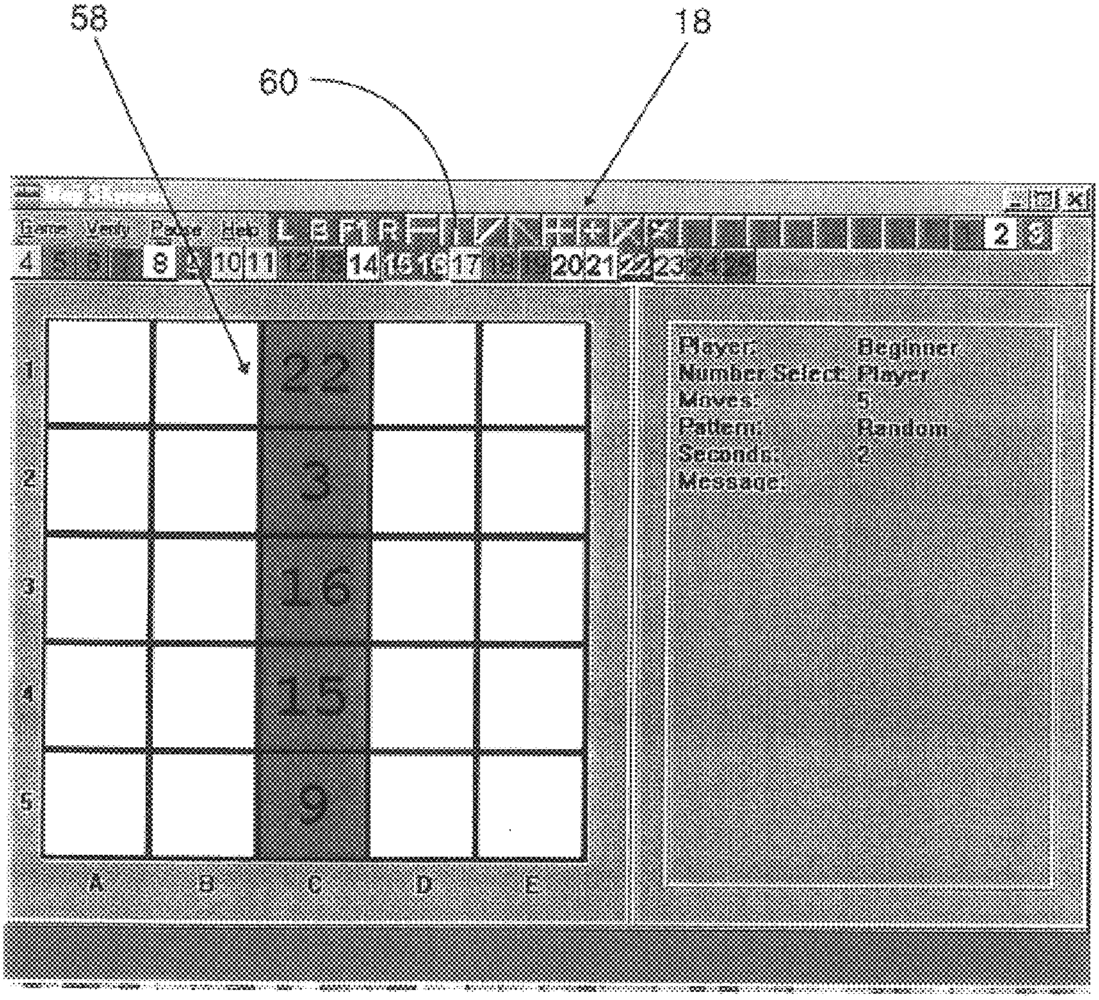
FIG. 7 illustrates a vertical pattern having the magic square property.

At FIG. 7, selecting the vertical tool bar 60 from the pattern tool bars 18, generates a vertical pattern 58 which is also a starting point of one of the basic magic squares.

Figure 8:
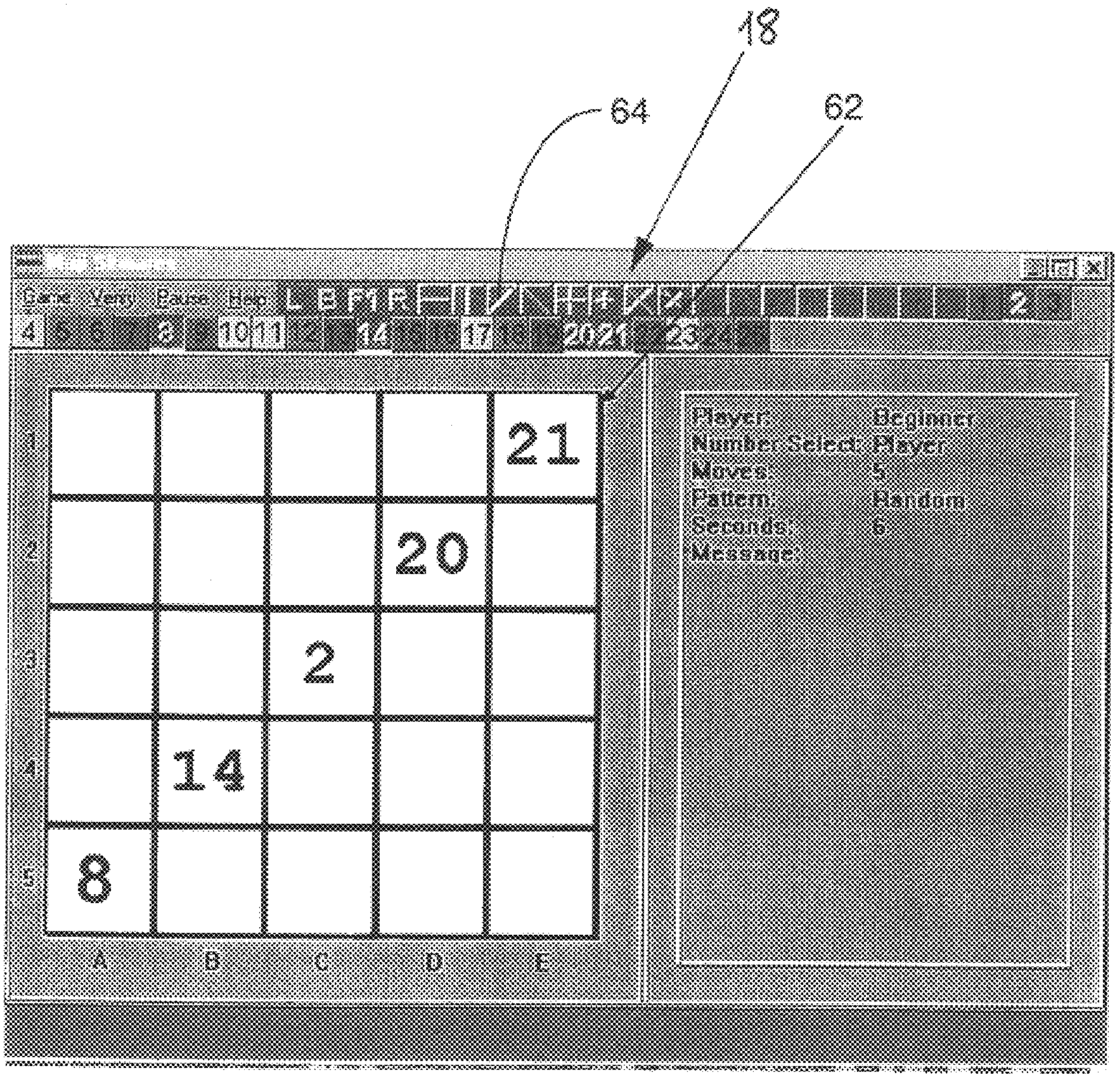
FIG. 8 illustrates a northeast diagonal pattern having the magic square property.

At FIG. 8, selecting the northeast diagonal tool bar 64 from the pattern tool bars 18, generates a northeast diagonal pattern 62 which is also a starting point of one of the basic magic squares.

Figure 9:
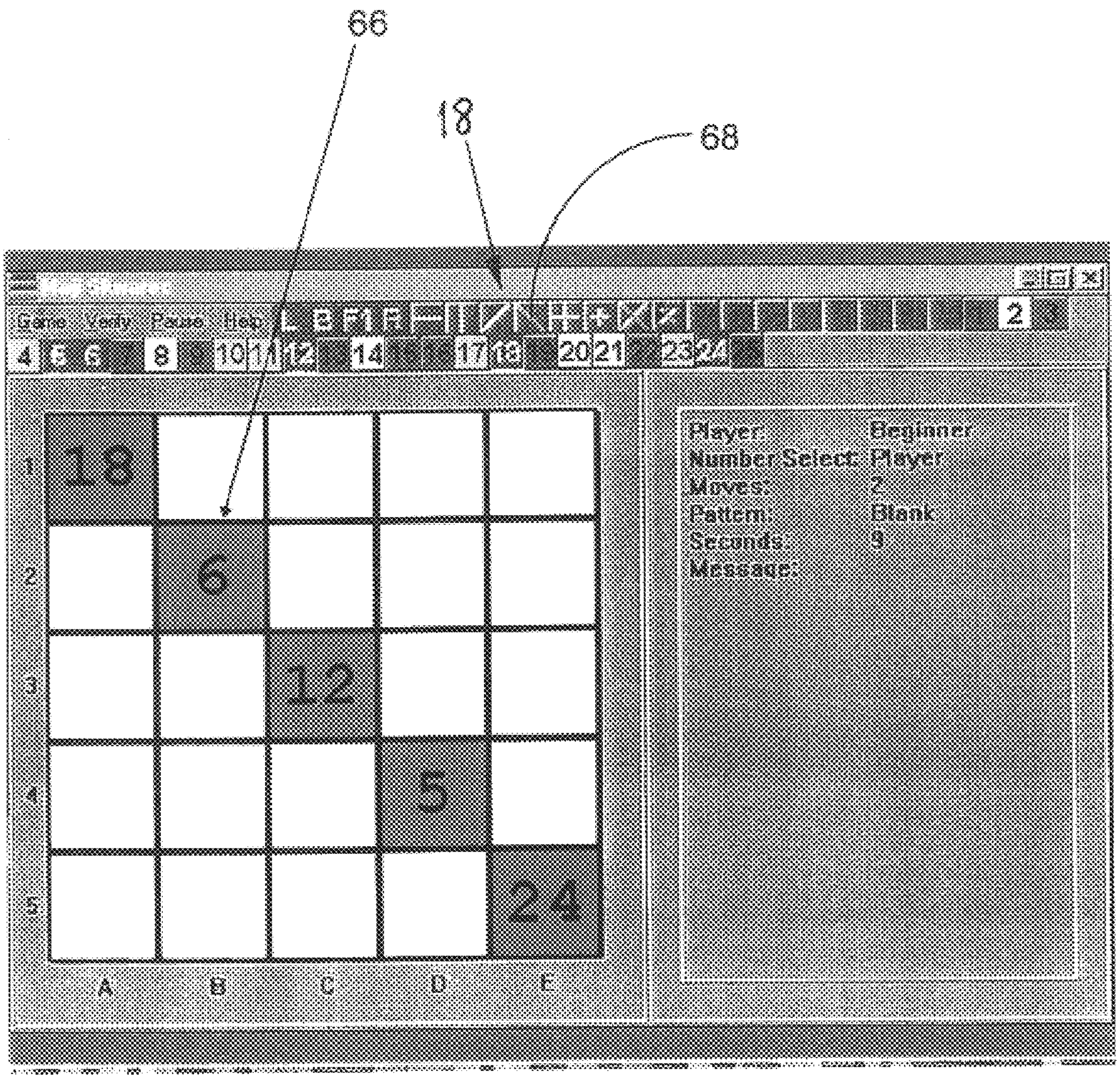
FIG. 9 illustrates a southeast diagonal pattern having the magic square property.

At FIG. 9, selecting the southeast diagonal tool bar 68 from the pattern tool bars 18, generates a southeast diagonal pattern 66 which is also a starting point of one of the basic magic squares.

Figure 10:
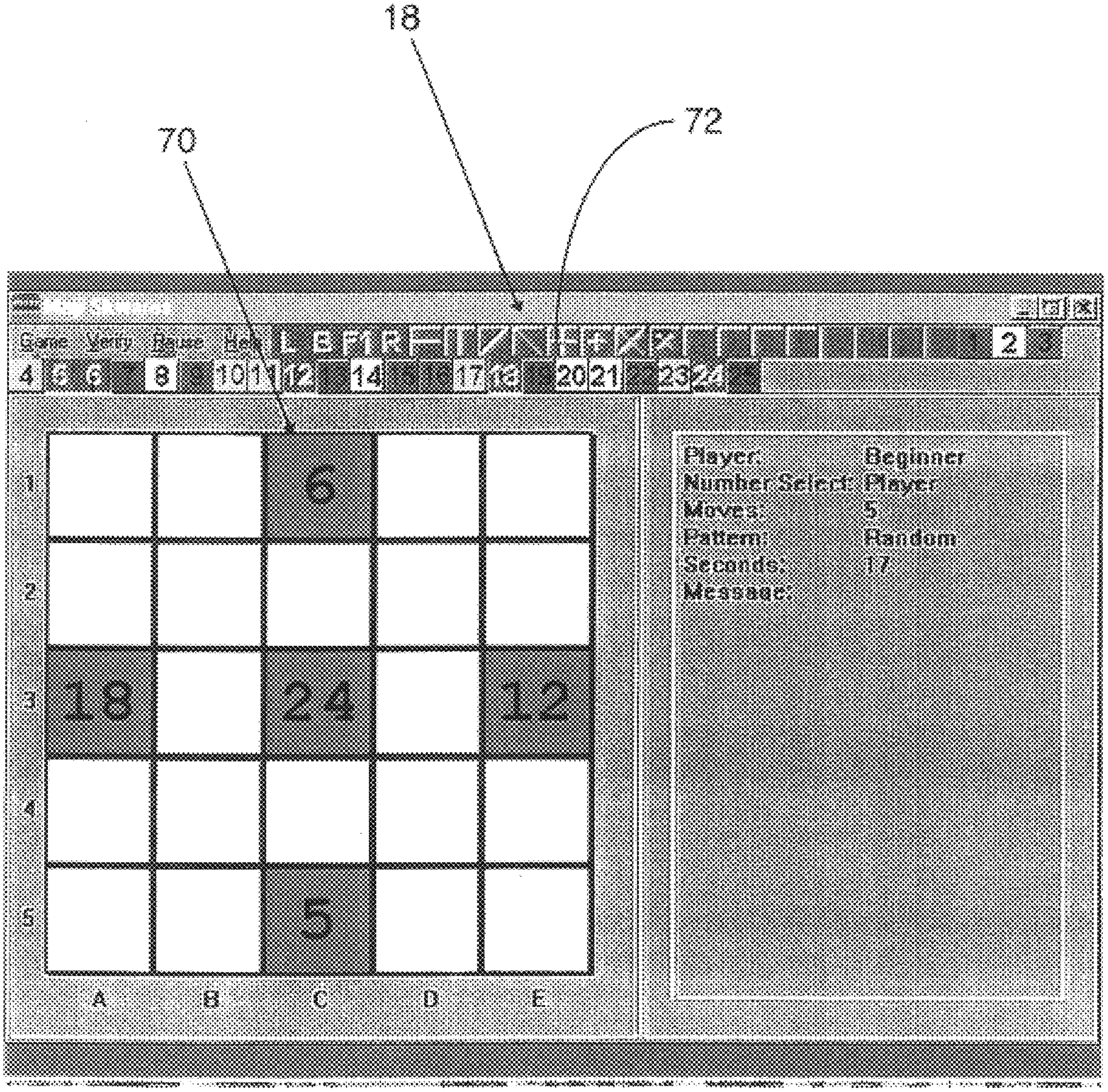
FIG. 10 illustrates a large cross having the magic square property.

At FIG. 10, selecting the large cross tool bar 72 from the pattern tool bars 18, generates a large cross pattern 70 which is also a starting point of one of the basic magic squares.

Figure 11:
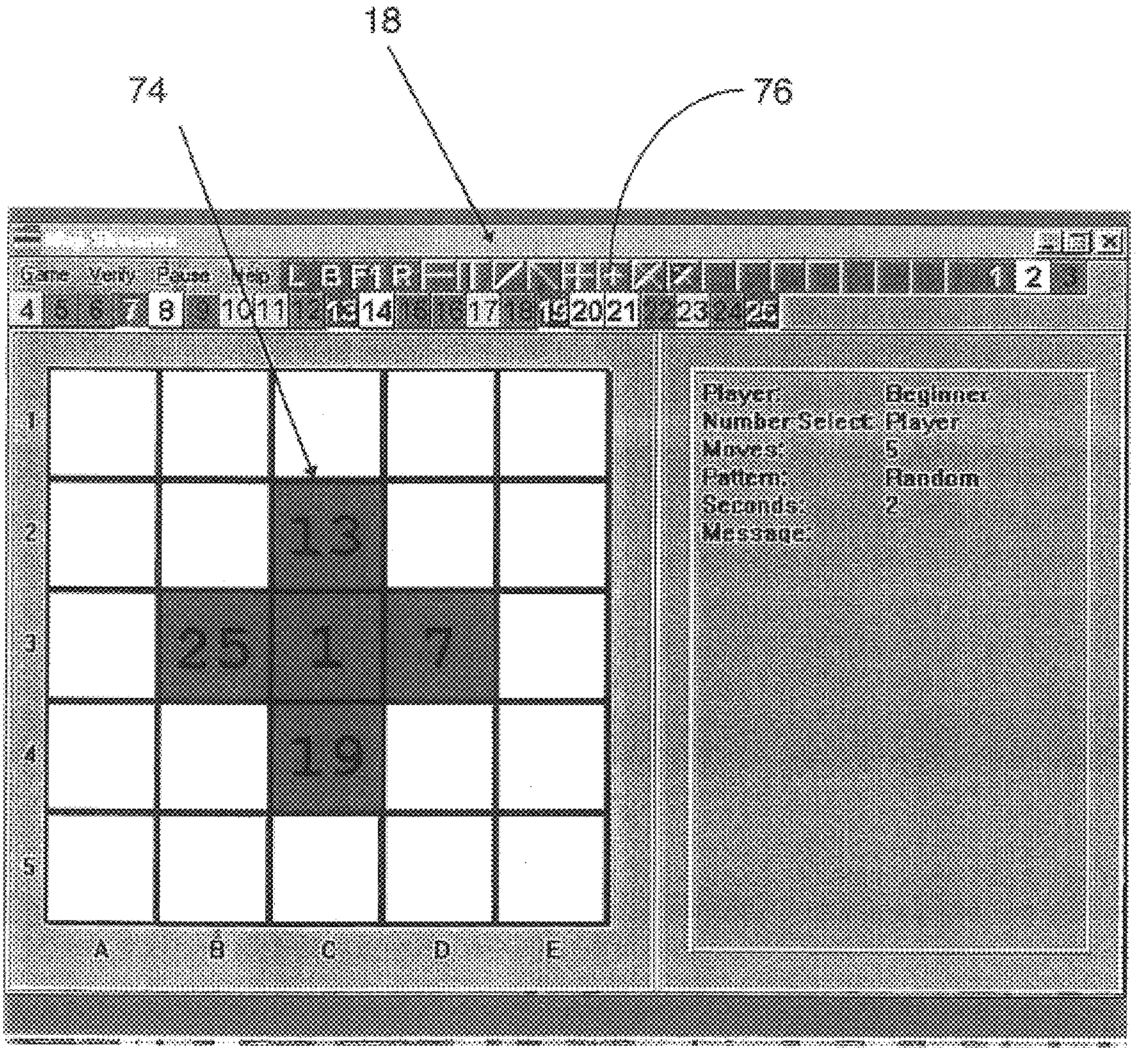
FIG. 11 illustrates a small cross having the magic square property.

At FIG. 11, selecting the small cross tool bar 76 from the pattern tool bars 18, generates a small cross pattern 74 which is also a starting point of one of the basic magic squares.

Figure 12:
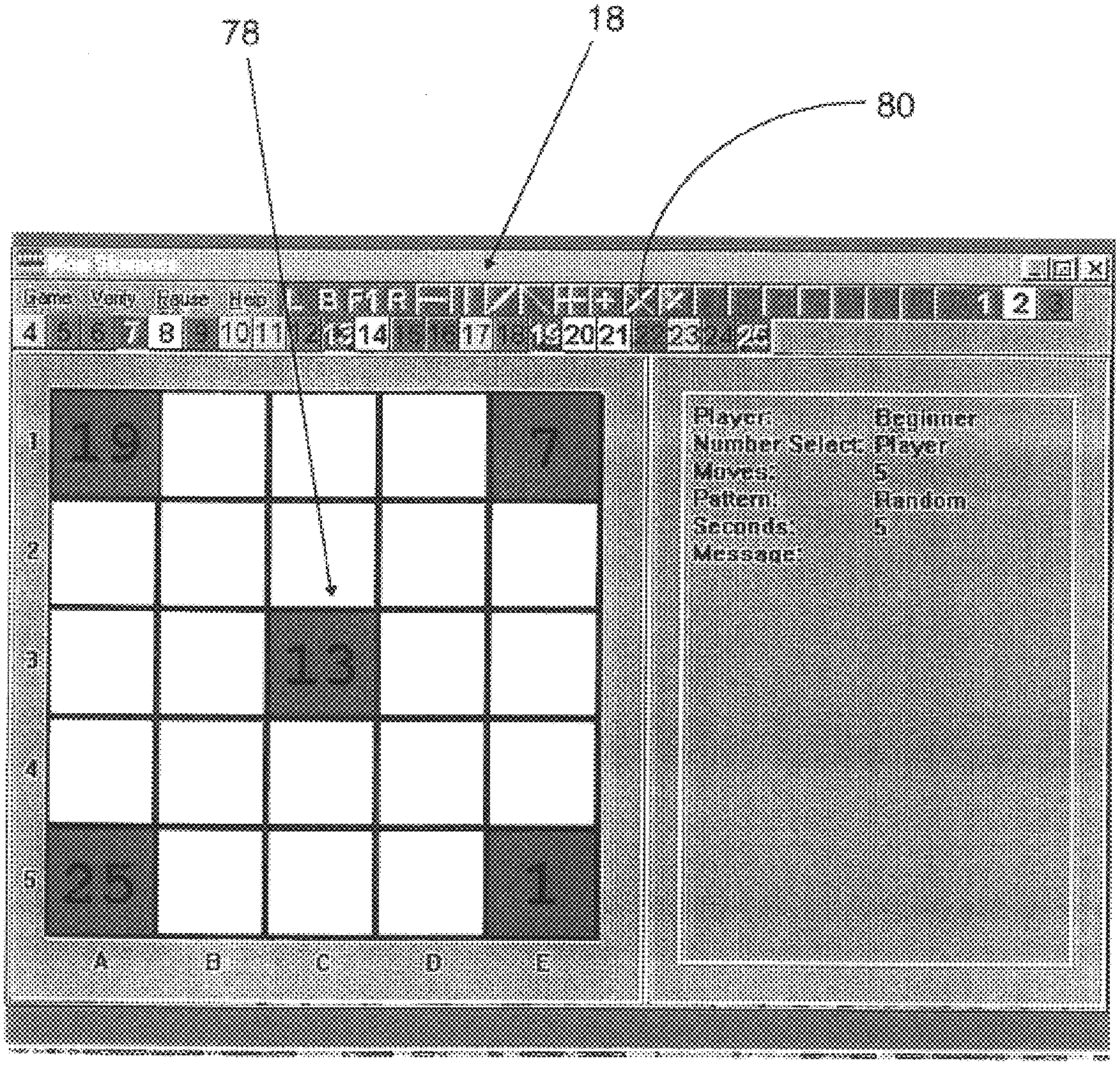
FIG. 12 illustrates a large diagonal cross (also referred to as a large 'X') having the magic square property.

At FIG. 12, selecting the large diagonal cross tool bar 80 from the pattern tool bars 18, generates a large diagonal cross pattern 78 which is also a starting point of one of the basic magic squares.

Figure 13:
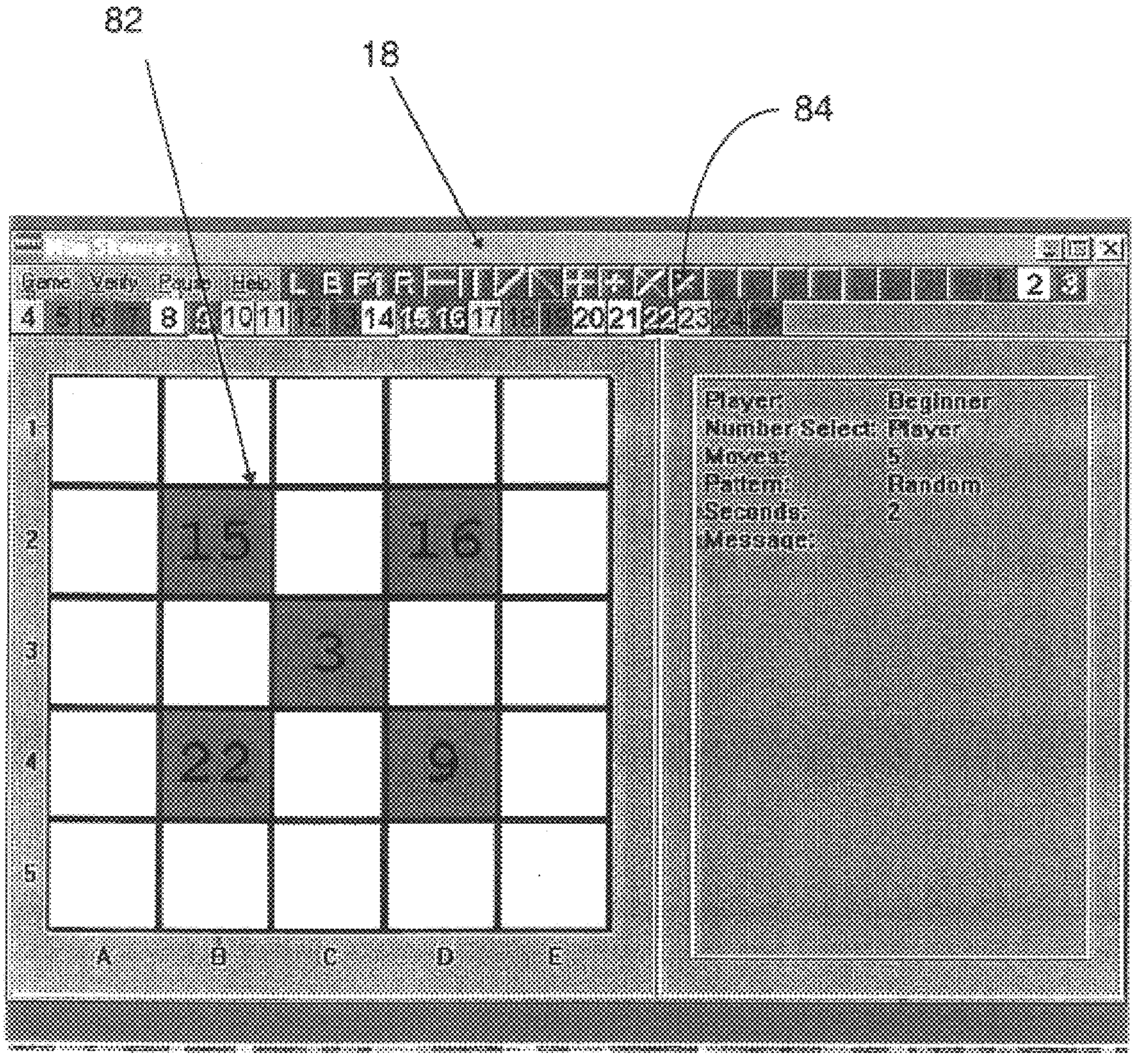
FIG. 13 illustrates a small diagonal cross (also referred to as a small 'x') having the magic square property.

At FIG. 13, selecting the small diagonal cross tool bar 84 from the pattern tool bars 18, generates a small diagonal cross pattern 82 which is also a starting point of one of the basic magic squares.

Figure 14:
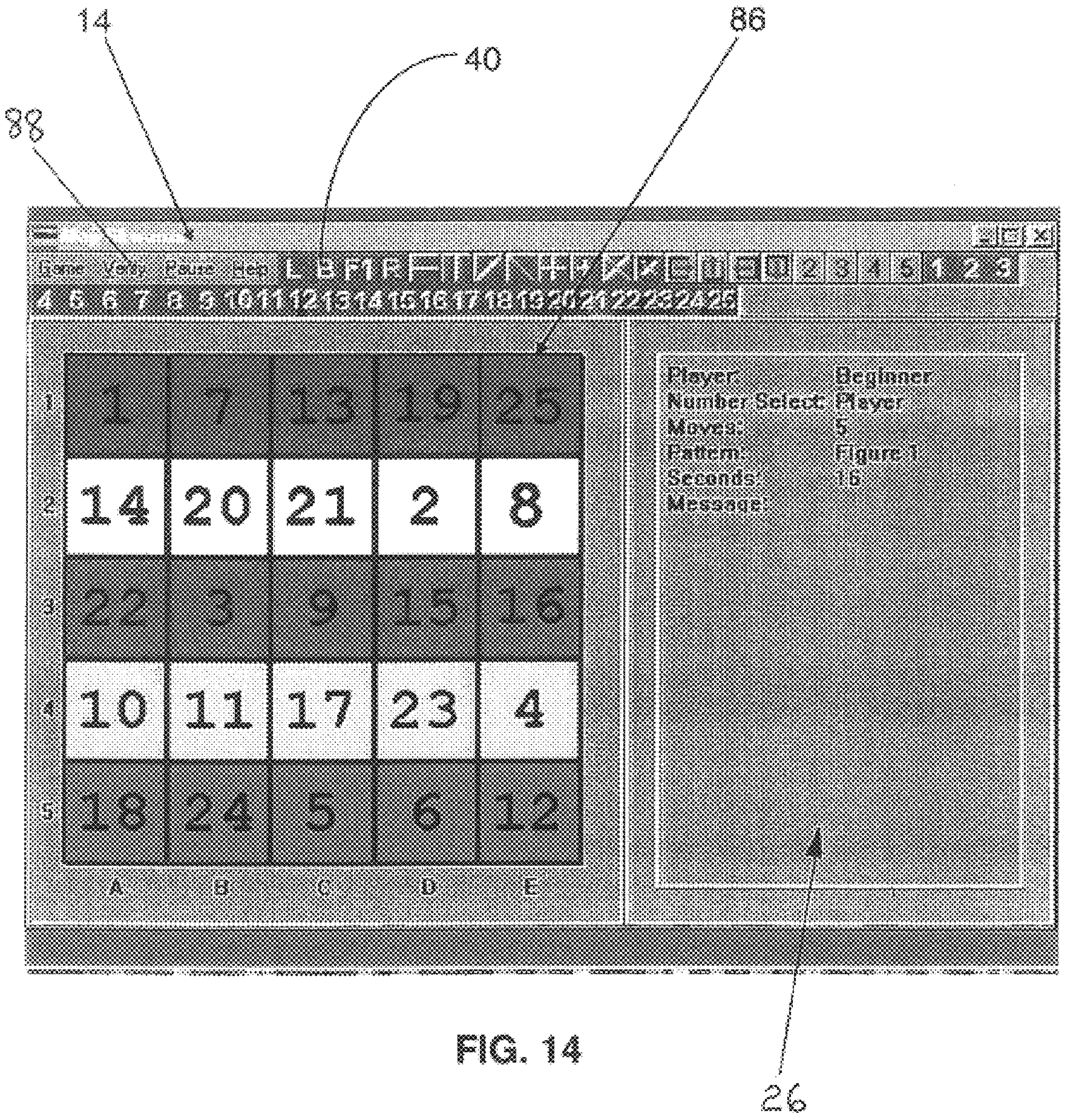
FIG. 14 illustrates a completed magic square.

FIG. 14 illustrates a completed magic square 86. It is appreciated that this is one out of a possible 14,400 magic squares that may be realized with a 5×5 magic square. To verify that the pattern indeed forms a magic square the verify tool bar 88 may be selected from the menu tool bar 14 using the mouse. The computer will conduct a test to verify the magic square and place the results next to the "messages" in the game status screen display area 26. If the computer is asked to verify a magic square and subsequently reports that it is not correct, the player may begin switching numbers with the mouse to correct any errors, and then again ask the computer to verify the revised magic square.

At any point, if the present grid pattern has not been verified, the player may use the "New Hand" tool bar 40 to erase the grid and begin over. If the grid pattern is verified as a magic square the computer automatically clears the grid for a new game. However, it will retain the verified magic square for further use unless erased by the start of a new game.

Figure 15:
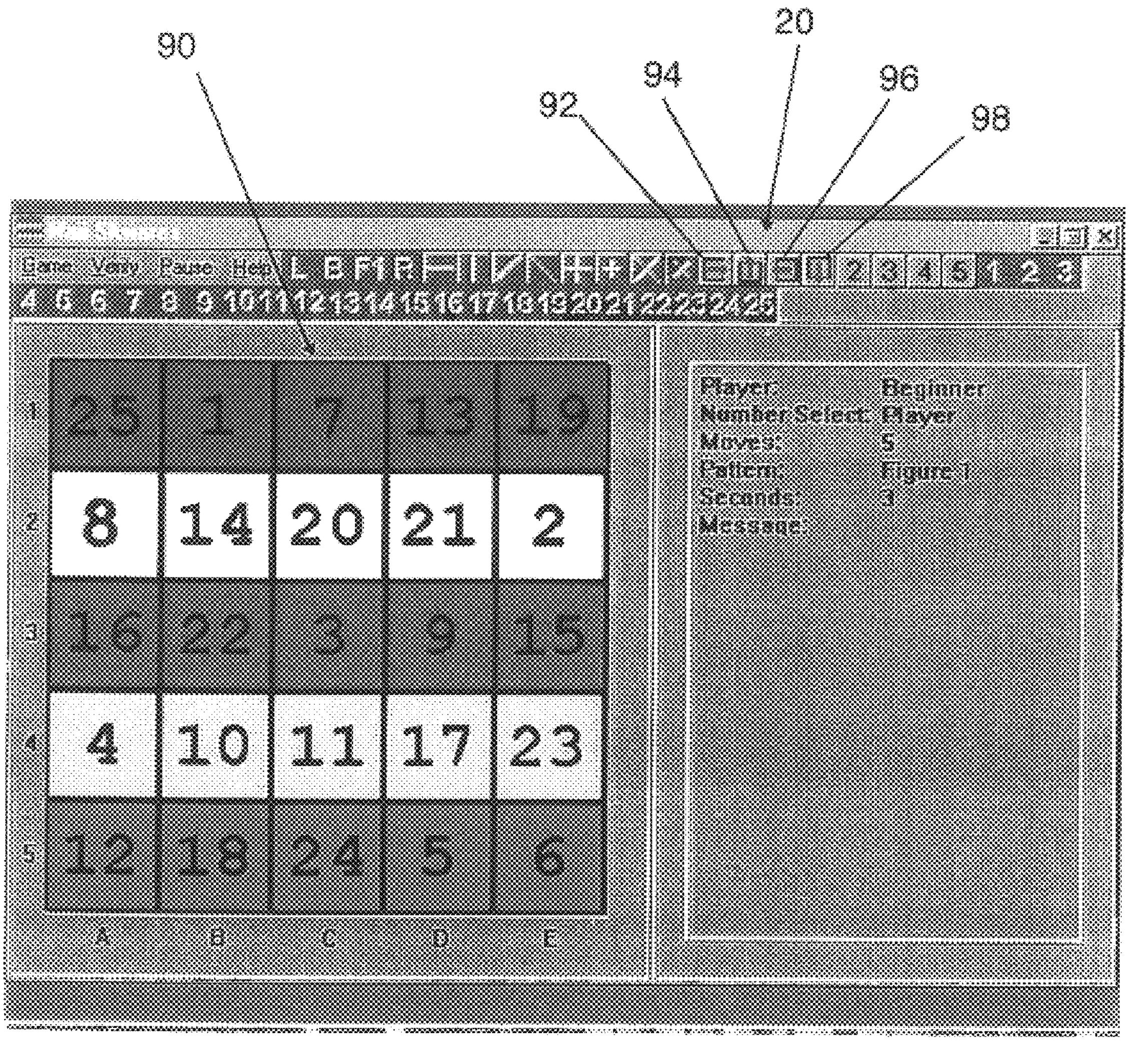
FIG. 15 illustrates the magic square of FIG. 14 shifted one column to the right.

Another feature of the computer game software program of the preferred embodiment according to the present invention is the menu tool bar with directional arrows 20 as illustrated at FIG. 15. The directional arrows right 92, up 94, left 96 and down 98 are provided to facilitate shifting the entire magic square, in the respective direction while maintaining its characteristic properties. FIG. 15 illustrates the completed magic square 86 of FIG. 14 shifted to the right once by activating the shift right tool bar 92. Cells in the rightmost column wrap, or reenter, in the leftmost column, the magic square 90 being a valid magic square.

Figure 16:
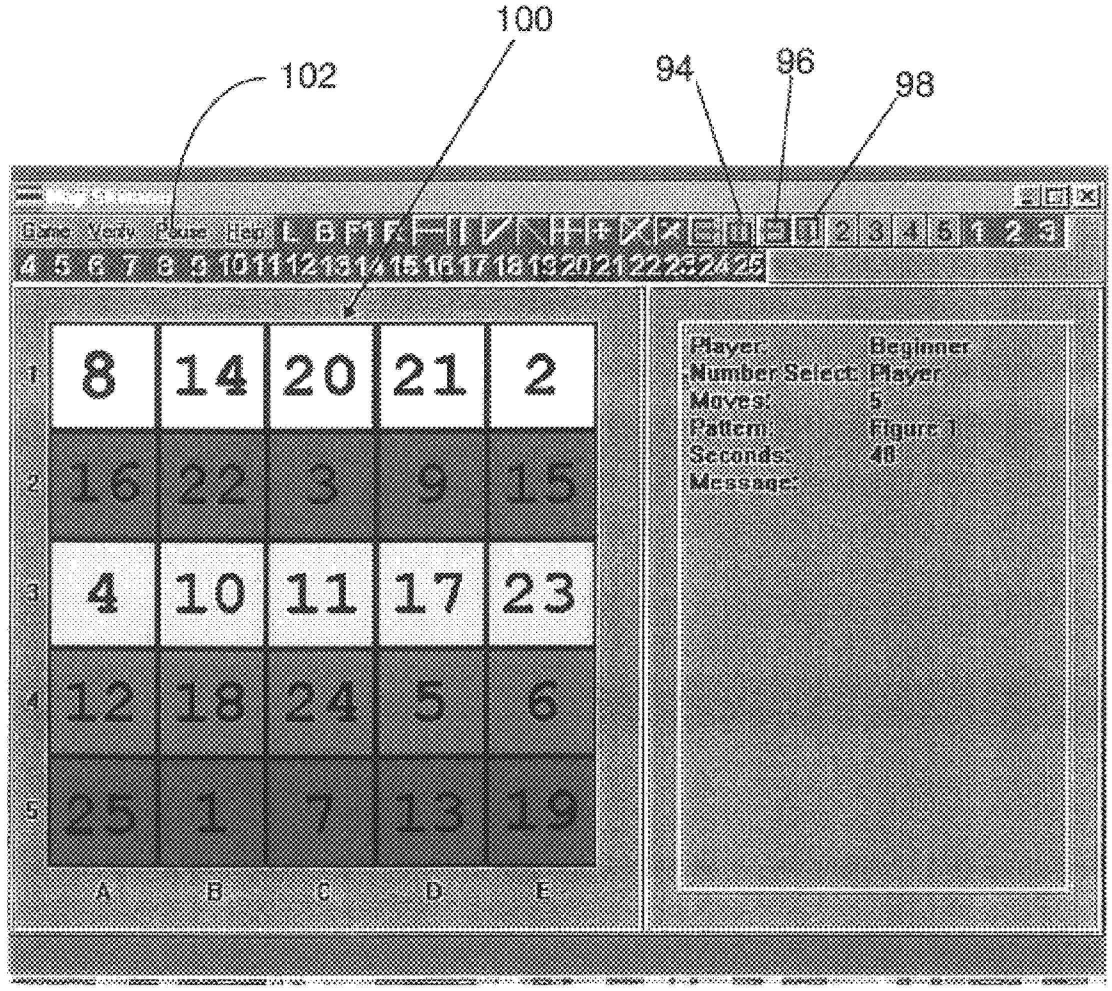
FIG. 16 illustrates the magic square of FIG. 14 shifted one column to the right and one row upwards.

FIG. 16 illustrates the completed magic square 90 of FIG. 15 shifted up once by activating the shift up tool bar 94. Cells in the uppermost row wrapping and reentering in the bottom row, the magic square 100 being a valid magic square. It is appreciated that the shift left 96 and the shift down 98 tool bars effect the magic square in similar ways.

The computer game software program also includes a timer which records the number of seconds the player uses in performing a given assignment. The number of seconds being displayed in the game status screen display area 26. A pause tool bar 102 (FIG. 16) allows the player to stop the timer, for whatever cause is permitted by the rules of the game.

Figure 17:
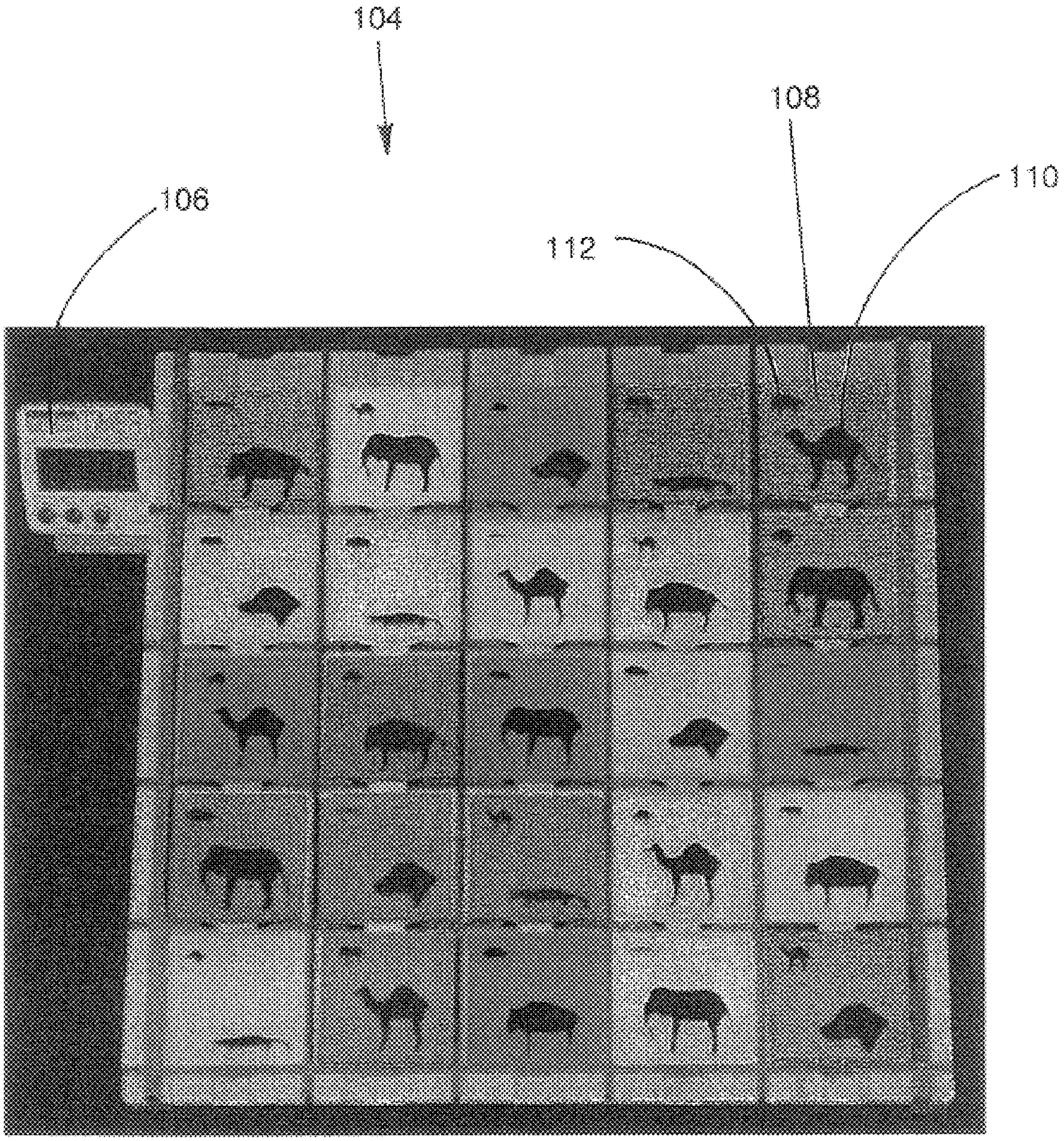
FIG. 17 illustrates a Magic Squares board game using animals in place of integers.

FIG. 17 illustrates a table top version of a Magic Square board game 104 implemented utilizing animals. Each element 108 comprises a large animal FIG. 110, a small animal FIG. 112 and has a certain coloration. A timer 106, one of six, is included for timing the manipulation and arrangements to form a valid magic square using the animal figures.

Figure 18:
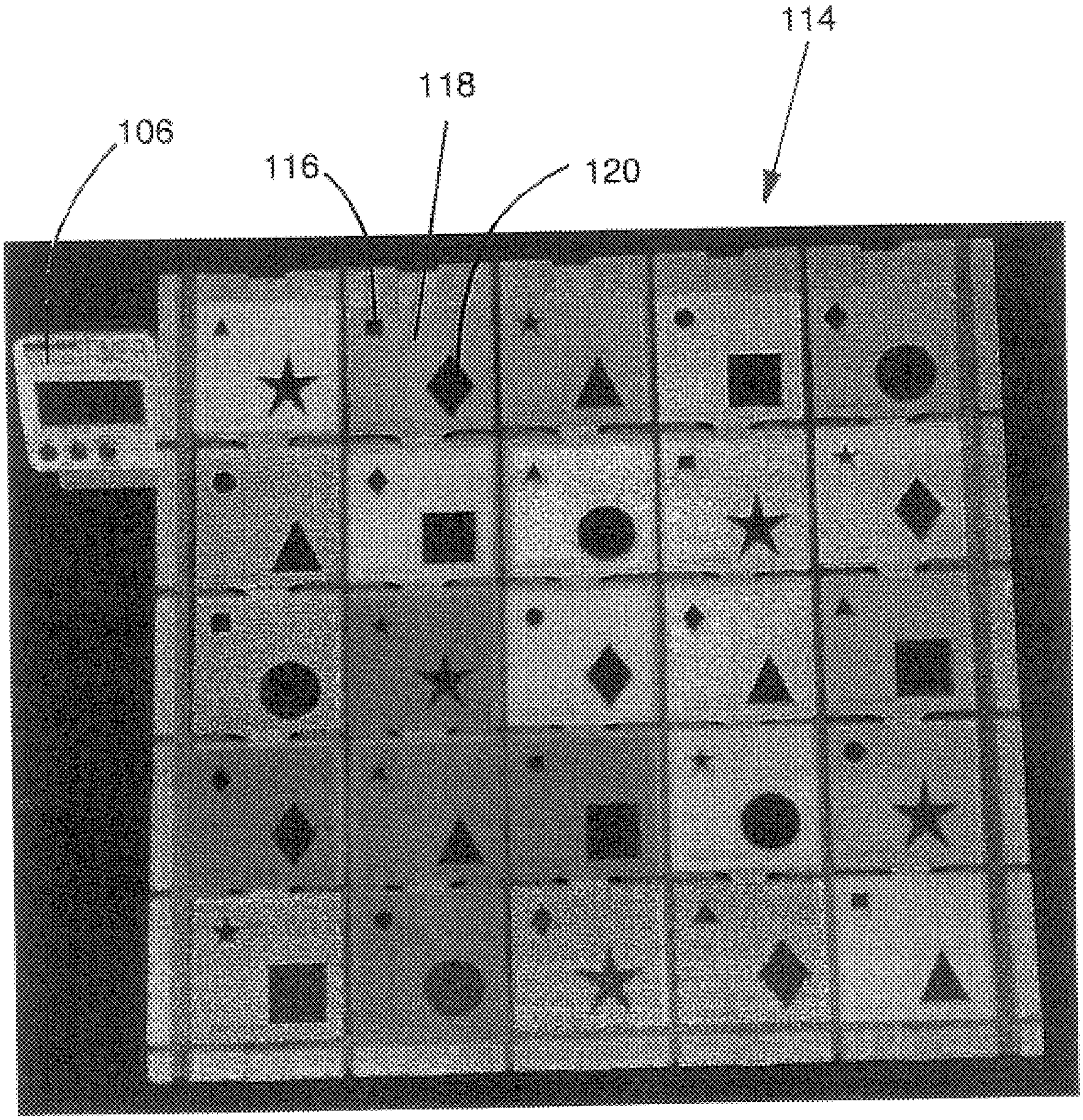
FIG. 18 illustrates a magic square using geometric figures.

FIG. 18 illustrates a table top version of a Magic Square game board 114 utilizing geometric symbols. Each element 118 comprises a large geometric FIG. 120 and a small geometric FIG. 116, In addition to having one of five distinct coloration's. Timer 106 is included for timing the manipulations of the geometric figures to form a valid magic square.

Figure 19:
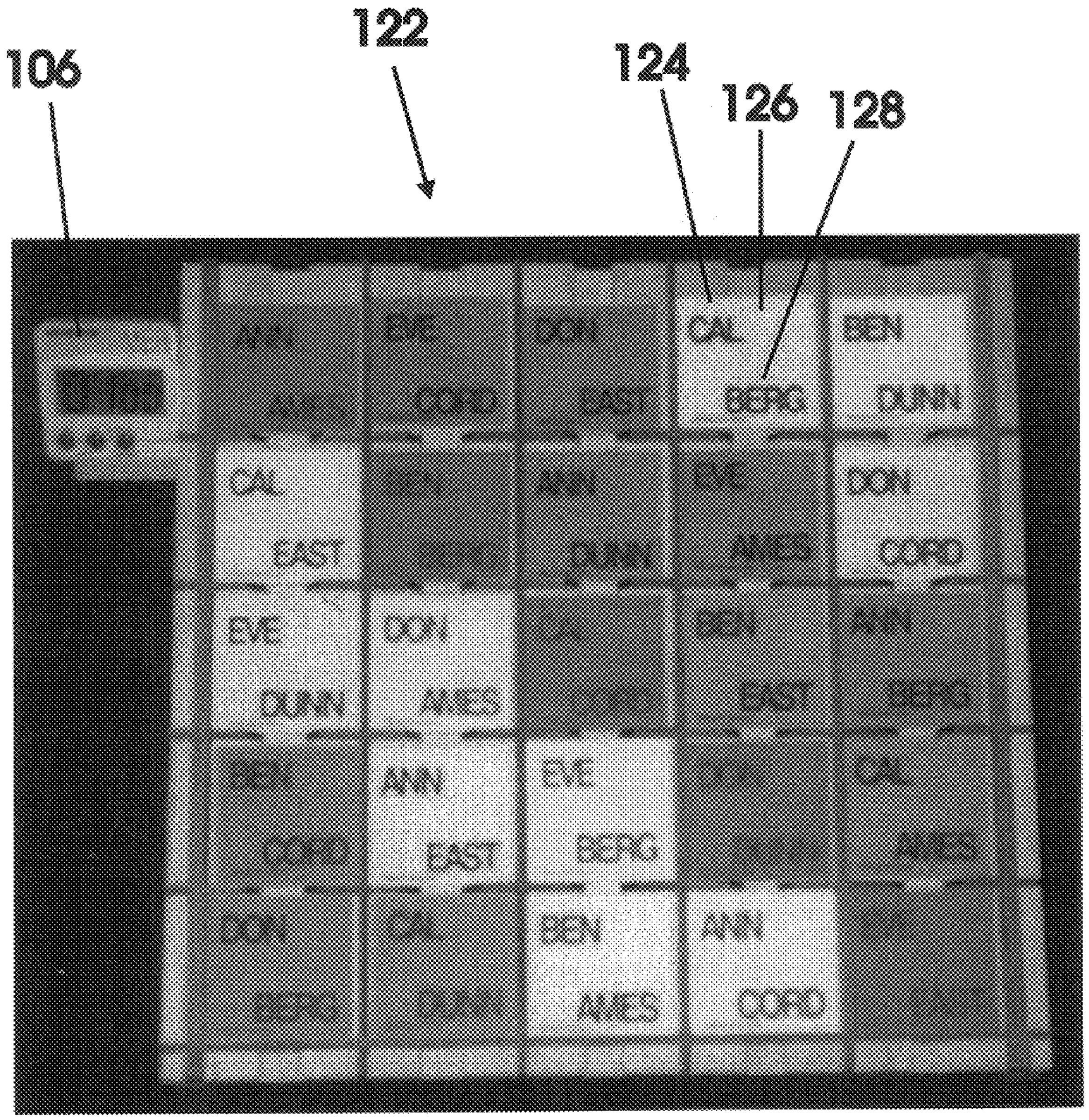
FIG. 19 illustrates a magic square utilizing names.

FIG. 19 illustrates a table top version of a Magic Squares game board 122 utilizing names. Each element comprises a lower name 128 and an upper name 124 and one of five distinct coloration's. Timer 106 is included to time the manipulation of elements 126 to form a valid magic square.

Figure 20:
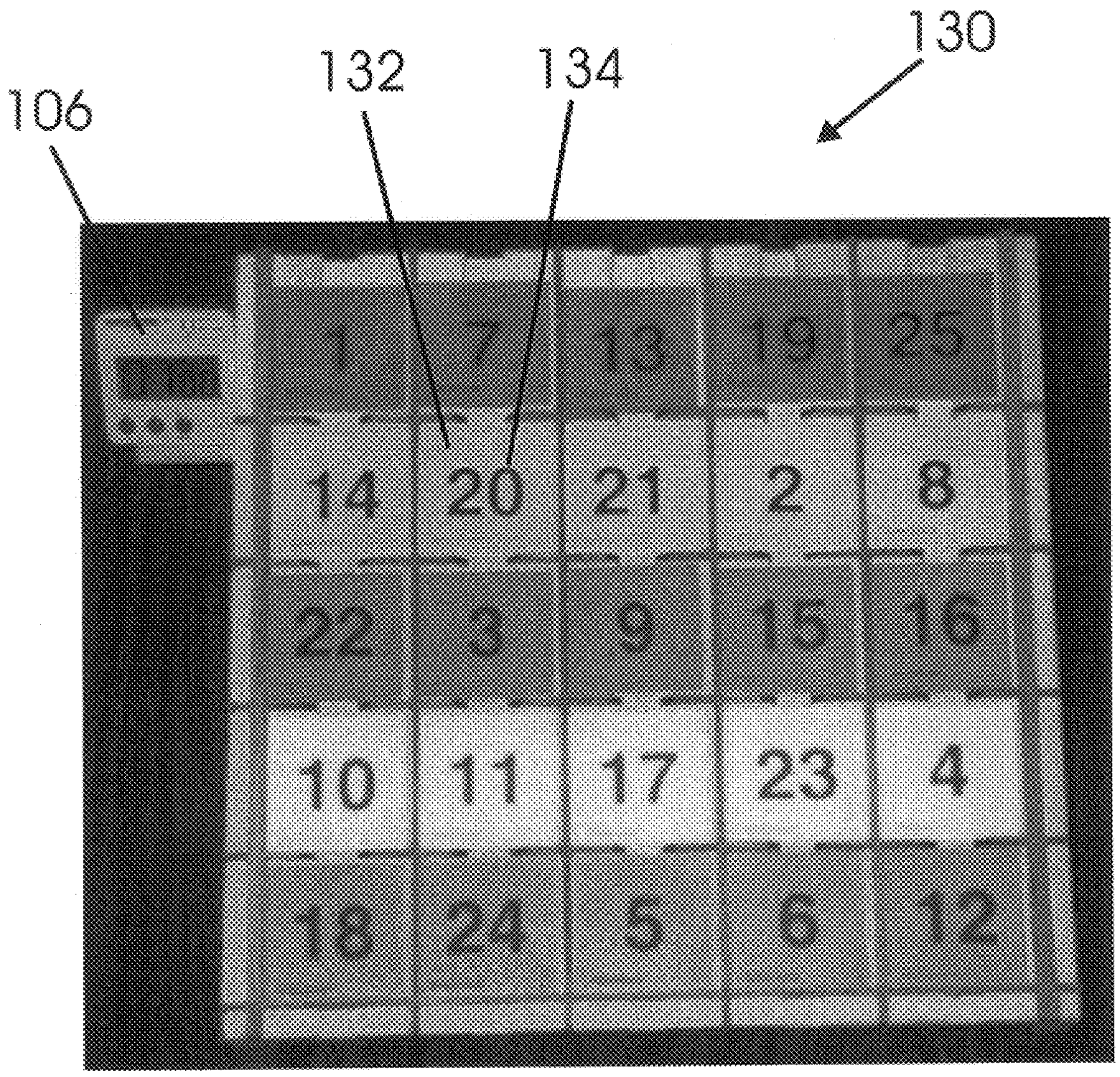
FIG. 20 illustrates a magic square using the integers 1–25.

FIG. 20 illustrates a table top version of a Magic Squares game board 130 utilizing the integers 1–25. Each element 132 comprises an integer 134 and has a distinct coloration selected from a group of one of five distinct colors. Timer 106 is included to time the manipulation of elements 132 to form a valid magic square.

Figure 21:
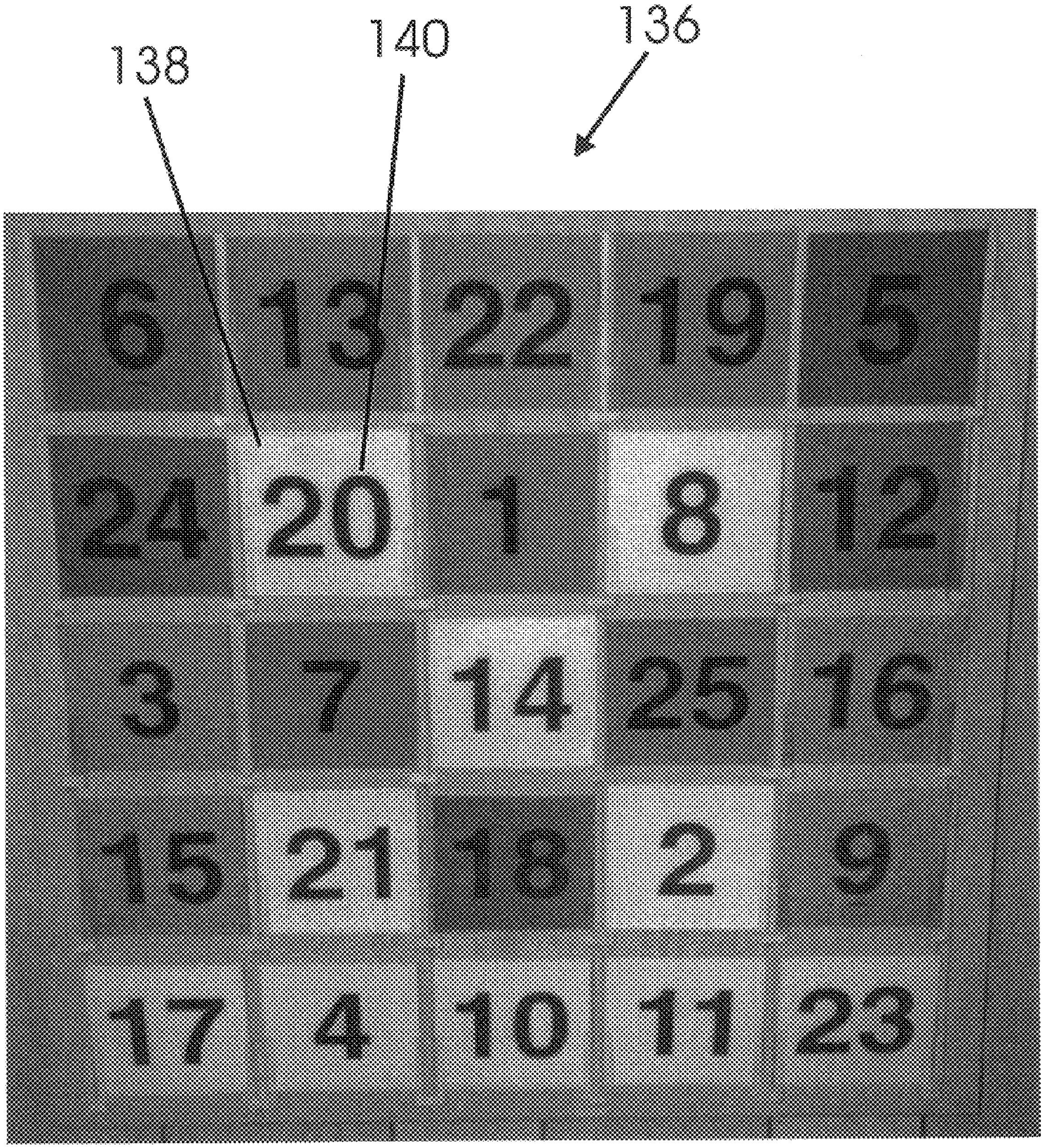
FIG. 21 illustrates a vertically disposed embodiment of a Magic Square board game.

FIG. 21 illustrates a vertically disposed Magic Square game board 136 comprising the integers 1–25 as the elements. Each element 138 comprises an integer 140 on one of five distinct coloration's.

The foregoing is but one embodiment of a computer game software program in accordance with the principles of the present invention as designed for magic squares. It allows players, one at a time, to play any of the games with numbers described in the text on magic squares.

It will be appreciated that the embodiment described above is but one of many embodiments in keeping with the principles of the present invention.

In other embodiments of the present invention there might be provided a computer program for magic squares including the following features:

1. Letters, names, symbols, animals, and various other substitutes for numbers.

2. Assignments requiring a number of magic squares to be completed in succession.

3. Verification of a specific magic square. Present program only verifies that the grid pattern is a magic square (not whether it is the assigned magic square).

4. Automatic scoring.

5. Screen with two grids and two mouse for head-to-head competition. Present program allows only one player at a time.

6. A "help" menu to enable a player to find out which of many magic squares maneuvers are needed to perform a specified assignment.

7. A program to play the cryptogram game.

8. A program to permit competition with another player on the Internet.

9. Magic squares programs for small, hand-held electronic computers like "Game Boy".

10. Provision for the computer to be instructed to perform specified switches: e.g. 1-3-4 player switch calls for the following numbers to be switched: 1-3-4, 6-8-9, 11-13-14, 16-18-19, 21-23-24. Computer could have a menu bar for player switches and need only be told to do a "1-3-4". Similar bars could perform team switches, cross switches and various other player switch formats.

It will be appreciated that in addition to numbers the elements comprising the magic square matrix may be symbols, animals, names, letters and other indicia, assigned to numerical values as follows:

| SYMBOL | SMALL SYMBOL NUMERICAL VALUE | LARGE SYMBOL NUMERICAL VALUE |
|---|---|---|
| Square | 1 | 0 |
| Circle | 2 | 5 |
| Triangle | 3 | 10 |
| Diamond | 4 | 15 |
| Star | 5 | 20 |
| **ANIMAL** | **SMALL ANIMAL NUMERICAL VALUE** | **LARGE ANIMAL NUMERICAL VALUE** |
| Alligator | 1 | 0 |
| Buffalo | 2 | 5 |
| Camel | 3 | 10 |
| Dog | 4 | 15 |
| Elephant | 5 | 20 |
| **FIRST NAME/ SURNAME** | **FIRST NAME NUMERICAL VALUE** | **SURNAME SYMBOL NUMERICAL VALUE** |
| Ann/Ames | 1 | 0 |
| Ben/Berg | 2 | 5 |
| Cal/Cord | 3 | 10 |
| Don/Dunn | 4 | 15 |
| Eve/East | 5 | 20 |
| **LETTER** | **LOWER CASE LETTER NUMERICAL VALUE** | **UPPER CASE LETTER NUMERICAL VALUE** |
| A | 1 | 0 |
| B | 2 | 5 |
| C | 3 | 10 |
| D | 4 | 15 |
| E | 5 | 20 |

For example, in one embodiment in accordance with the principles of the present invention, the formula to locate numbers in a D1R3 magic squares may be described as follows:

In all magic squares constructed with the D1R3 pattern with consecutive numbers beginning with 1 in the upper left corner, the location of each number can be exactly calculated even without completing the magic square.

The formula for the horizontal row in which the number will occur is given by:

$$H=N-M-P$$

where

N=number whose location is desired;

H=number of the horizontal row in which N occurs;

M=the largest multiple of the number of squares on a side which can be subtracted from N without reducing it to zero; and P=M÷number of squares on a side;

In a 5×5 magic square, M is the largest multiple of 5 which can be subtracted from N and P=M÷5. The formula for the vertical column in which the number will occur is given by:

$$V=3H+P-2;$$

To find the location of 19 in a 5–5 magic square:

$$N=19;$$

$$M=15;$$

$$P=3;$$

$$H=19-15-3=1; \text{ and}$$

$$V=3\times 1+3-2=4;$$

Thus 19 is the fourth number in the first row.

To find 23 in a 5–5 magic square:

$$N=23 \qquad H=23-20-4=-1$$

$$M=20 \qquad V=-3+3-2=-2$$

$$P=4$$

To convert the negative numbers to the physical reality of a magic square, add multiples of 5 until a positive number is reached thus:

H=−1+5=4;

V=−2+5=3;

If the mathematical answer is greater than the number of squares on a side, subtract multiples of the latter until a number within the square is reached. This is true for all magic squares of the D1R3 design.

The location of any number in a 71×71 square could be calculated as follows:

e.g. 429

$$N=429 \qquad H=429-426-6=-3 \quad H=-3+71=68$$

$$M=426 \qquad V=3X-3+6-2=-5 \quad V=-5+71=66$$

$$P=6$$

Therefore 429 would be the 66th number in the 68th horizontal row.

The Rules of One Embodiment of a Magic Squares Board Play

One embodiment of a board game in accordance with the principles of the present invention will now be described. It will be appreciated, that as with the computer program embodiment, there are numerous embodiments of the board game which might be in keeping with the principles of the present invention.

1. PAR TIME

Every assignment in magic squares competition must have a par time to be used to award bonuses and to assess penalties. In most instances, the draw will specify the exact requirements of the assignment and the par time in seconds. If the par time is not specified, the players should agree on a par time approximately 5 seconds higher than the best practice time of the slowest player.

2. BANKER

The player selected in the draw as the last to play shall serve as banker, unless a designated banker has been approved by all the players. The banker will supply each player with 500 million Megabucks from the bank at the beginning of each game. He will pay all bonuses from and deposit all penalties in the bank, except as specially provided in Rules 9 and 11d.

3. STARTING PLAY

Each player shall draw a number, blindly, and the player with the highest number will begin. The turn will rotate clockwise. The player will draw an assignment card. If a particular board set-up is specified, the board should be so prepared, and the remaining numbers mixed and piled face down or laid out face up, depending upon whether the numbers are to be selected at random or at the player's discretion. In random selection, the player must not choose the same color twice in a row unless only one color remains.

4. TIMING

Timing shall be done by the player next in line to play, unless a designated timer has been accepted by all players. A player's turn will begin when the timer says "go"; timing will cease when the player says "done", or when the time exceeds the par time by 25 seconds and the timer says "stop".

5. BETTING

Before commencing his turn a player must place a bet in increments of 20 million up to 200 million Megabucks. He must bet 200 million or at least half of his money on every turn, except that once in every game he may make a lesser bet of 20 million or more. On this turn, he may attempt the assignment or forfeit 10 million if he prefers. A player may bet more than he has, but when his turn is over he must pay the bank any penalties due, based on the size of his bet (plus any error penalties due another player), and if he cannot, he forfeits the game. If he has no money after paying all penalties, but owes nothing, he may continue as long as he is able to stay out of debt.

6. BONUSES

If a player completes his assignment within par time, he receives a bonus equal to 50% of his bet. For every five seconds he finishes under par time he receives another extra 10% bonus up to a maximum of 50%. No extra bonus is awarded for odd seconds; i.e. 1–4, etc. For any time bonus, the player will receive the specified % of the bet or 10 million Megabucks, whichever is larger.

7. TIME PENALTIES

If a player finishes above par time, he receives no regular bonus and is penalized 10% for every 5 seconds over par time up to a maximum penalty of 50%. The minimum penalty is 10 million Megabucks. No penalty is assessed for odd seconds; 1–4, etc.

8. ERROR PENALTIES

If a player makes mistakes in his magic square (which he has not corrected during play) he receives no bonuses. Penalties, in addition to time penalties, will be assessed as follows: 2 numbers out of place, 10%; 3 or 4 numbers out of place, 20%; more than 4 numbers out of place, 50%. Empty spaces will be counted as mistakes. Total time and error penalties cannot exceed 50% of the bet, combined.

9. CHECKING FOR ERRORS

After a player's turn has ended, either by his declaring "done" or the timer calling "stop," the timer will have 15 seconds to check the magic squares for errors. If the timer finds errors, the player, of course, will receive no bonuses from the bank and must pay time and error penalties to the bank. If these penalties are less than 50%, each other player in turn may have 15 seconds to check for further errors. A player finding further errors is entitled to the additional error penalties, up to an amount which will not cause the total penalties to exceed 50%.

10. WINNING

Play will continue until one player reaches a billion Megabucks, after which the round is completed, and the player with the most Megabucks is the winner. If two or more are tied for top money, they may agree to a one-turn playoff.

11. MISCELLANEOUS RULES a. Players may agree ahead of time to play a specified number of rounds, or after five rounds, by mutual consent, agree to end the game after two or more rounds. In each case, the player with the most Megabucks is the winner.

b. In contests where assignments are randomly selected, players should agree before the game as to whether bets must be placed before or after the assignment is known.

c. If on a given round every player receives a bonus for achieving par, and at least one player earns a time bonus, then 5 seconds will be subtracted from par time for the following round. If no player achieves par (receives a par bonus) on a given round, then 5 seconds will be added to par time for the following round.

d. In case of an error by the timer, the player may elect to replay the assignment or draw another, or pass his turn without penalty, or accept such remedial compensation as a majority of players vote to award. If a timer errs twice on the same player's turn, he must pay the player a par bonus (50% of bet) out of his own money and forfeit his turn. If he lacks sufficient money to pay said bonus he must pay all he has, and the bank will pay the rest.

e. If an improper number appears or a number is missing during a player's turn, due to no fault of the player, he may elect to replay the assignment or draw a new one, or pass his turn without penalty. If the missing or improper number is the fault of the player, he is subject to the usual time and error penalties.

The rules of the magic squares board game might apply also to the embodiments of the computerized game to the extent applicable, subject, of course, to modifications incorporated in the programming.

The following are descriptions of some of the numerous embodiments of the various magic squares games in accordance with the principles of the present invention:

GAME I FIG. 1 (D1R3)

Complete the magic square from the given number and location selecting the numbers in forward order.

GAME II FIG. 1 (Any Method)

Complete a FIG. 1 magic square from the given number and location, drawing numbers at random, using any method.

GAME III Complementary Pairs

Complete a magic square from the given single color line using complementary pairs. You must draw and locate one complementary pair before drawing another. You may select the order in which you draw and no branching is permitted.

GAME IV Complementary Pairs

Complete a magic square from the given single color diagonal using complementary pairs. You must draw and locate one complementary pair before drawing another. You may select the order in which you draw , and no branching is permitted.

GAME V Complementary Pairs

Complete a magic square from the given 5-number pattern using complementary pairs. You must draw and locate one complementary pair before drawing another. You may select the order in which you draw, and no branching is permitted.

GAME VI Complementary Pairs and Branching

Complete a magic square from the given 5-number pattern using complementary pairs and branching. You may draw numbers in any order you prefer, and no indexing is permitted.

GAME VII Indexing

Complete a magic square from the given 5-number line or diagonal using indexing only. Numbers may be drawn at in any preferred order.

GAME VIII Indexing

Complete a magic square from the given 5-number +, x, ✠ or x using indexing only. Numbers may be drawn at in any preferred order.

GAME IX Free Style

Complete a magic square from the given 5-number pattern using any methods you prefer. Numbers may be drawn at in any preferred order.

GAME X Free Style

Complete a magic square from the given 5-number pattern using any methods you prefer. Numbers must be drawn at random.

GAME XI Rolling Pattern—Inner SL Path (1 Square)

Complete a magic square with a single color + or x in the center of the magic square, then roll said pattern on a SL into the inner path (8 numbers touching the middle of the square) then around the inner path, clockwise (CW) or counter-clockwise (CCW), moving the center one square at a time until back at the entry square, then roll said pattern into the middle square (total of 10 moves). A different par time will be given for +'s and x's.

GAME XII Rolling Pattern—Outer SL Path (1 Square)

Complete a magic square with a single color + or x in the center, then roll said pattern on a SL into the outer path (16 numbers not touching the middle square) then around the outer path, clockwise or counter-clockwise, moving the center one square at a time until back to the entry square, then roll said pattern into the middle square (total 20 moves). A different par time given for +'s and x's.

GAME XIII Rolling Pattern—Outer SL Path (2 Square)

Complete a magic square with a single color + or x in the center, then roll said pattern on a SL into the outer path and around the outer path clockwise or counter-clockwise, moving the center two squares at a time until back to the entry square, then roll said pattern into middle square (total 10 moves). Different par for +'s and x's.

GAME XIV Rolling Pattern—Inner/Path (1 Square) Complete a magic square with a single color + or x in the center, then roll said pattern on a/into the inner path and around the inner path clockwise or counter-clockwise, moving the center one square at a time until back to the entry square, then roll said pattern into middle square (total 10 moves). Same par for +'s and x's.

GAME XV Rolling Patterns—Outer/Path (1 Square)

Complete a magic square with a single color + or x in the center, then roll said pattern on a/into the outer/path and around said path clockwise or counter-clockwise, moving the center one square at a time until back to the entry square, then rolling said pattern into middle (total 20 moves). Different par for +'s and x's.

GAME XVI Rolling Patterns—Outer/Path (2 Square)

Complete a magic square with a single color + or x in the center, then roll said pattern on a/into the outer/path and around said path clockwise or counter-clockwise, moving the center two squares at a time until back to the entry space, then rolling said pattern into middle (total 10 moves). Different par for +'s and x's.

ANY GAMES XI THROUGH XVI CAN BE PLAYED USING ✠'S OR X'S.

These ✠ and x games are more difficult because the patterns are harder to follow and are not recommended for beginners.

GAME XVII Rotating Lines 90°

Rotate a single color H in row 1 90° counter-clockwise about the following corners in order: NE, SE, SW, NW and then 90° clockwise about the following corners, NW, SW, SE, NE, returning numbers in the H to exactly their original positions. Note that the 90° rotations clockwise are identical with the 90° counter-clockwise.

GAME XVIII Rotating Diagonals 90°

Rotate a single color SE through the center of the magic square 90° (clockwise, counter-clockwise) about the NW corner; then about number of said color in the SE through the SW corner; number of said color in the NE through SE corner; the number of said color in the SE through the NE corner; number of said color in the NE through the NW corner; rotate said NE around the NW corner (back to original SE). Stated another way: Rotate said SE 90° such that one number of that color is isolated in the NW corner; then rotate 90° so a number of that color is isolated in the SE corner; then, SW corner; NE corner; back to NW corner; then back to original SE.

GAME XIX Rotating SL's and D's 45° Either clockwise or counter-clockwise

A. H through NW corner, rotate 45° clockwise around NW, SE, NE, SW, SE, NW, SW, NE B. SE through center, rotate 45° clockwise around SE, NE, SW, SE, NW, SW, NE, NW C. H through NW corner, rotate 45° counter-clockwise around NE, SW, NW, SE, SW, NE, SE, NW D. SE through center, rotate 45° counter-clockwise around NW, NE, SW, NW, SE, SW, NE, SE GAME XX Treasure Hunt E.g. construct magic square with a single color + (or x) in center, roll pattern 2NE, 4W, 1SE, 3N, 2SW, 2NW, 3E and back to base camp. Remember 3 in one direction is the same as 2 in the opposite; 4, the same as 1 in the opposite.

GAME XXI Cryptogram Puzzle

Use the cryptogram and clues given (numbers substituted for letters) to solve the cryptogram and the related magic square. As the magic square is developed, additional letters will be disclosed for the cryptogram, and as the message in the cryptogram is disclosed, additional numbers will be found to help complete the magic square. A sample puzzle is included in the addenda. By selecting cryptograms of varying difficulty and supplying more or fewer clues, the puzzles can be adapted for players of almost any age or experience.

GAME XXII Ultimate Program

Programs of any length can be designed to test any player's knowledge and endurance by combining some or all of Games I through XX. Some of said games require less than a minute for proficient players (Games I–X). Others like Games XI–XIX may require 5 to 10 minutes. Substitution of the alternate designs: letters, names, symbols, animals etc. for the numbers at the beginning or at any stage in the program will generally increase the time required since few players will be equally proficient with all of the designs. In fact, a very entertaining alternative is to introduce all of the designs at one time, resulting in magic squares with numbers, letters, animals and various other indicia all in the same magic square.

The following is a sample of the Ultimate Program:

Expert time: 35 minutes

Beginner time: 60 minutes

Construct ✠ with red and yellow x in middle, centered on 4. Change yellow+to x, center 10; then ✠, center 11; then ✠, center 23; then +, center 4 back in middle of magic square. Roll yellow x 1 square east to inner track to location of entry, then back to the middle. Change red/to yellow, then to blue, then white, then green. Change ✠ to +PF, then to a+TF, then to x FF (requires team switch!), then to x with red H in top row. Rotate red H 90° counter-clockwise around the following corner in this order: NE, SE, SW, NW (back to original x). Change x to ✠ with green + in middle. Roll green + all the way down NE to original position, 1 square at a time. Then roll green + all the way up the SE to original position, 2 squares at a time. Then change magic square to FIG. 1.

The following is a sample of the cryptogram:

Solve the following cryptogram and complete the related magic square:

| | | | | | | | | | | | |
|---|---|---|---|---|---|---|---|---|---|---|---|
| A | R | I | S | E | | A | I | R | S | U | N |
| 22 | 14 | 24 | 16 | 20 | 8 | 22 | 24 | 14 | 16 | 11 | 10 |

| | | | | | | | | | |
|---|---|---|---|---|---|---|---|---|---|
| A | N | | K | I | L | L | T | H | E |
| 22 | 10 | 13 | 19 | 24 | 21 | 21 | 23 | 17 | 20 |

| | | | | | | | | | | |
|---|---|---|---|---|---|---|---|---|---|---|
| E | N | V | I | O | U | S | | O | O | N |
| 20 | 10 | 18 | 24 | 12 | 11 | 16 | 3 | 12 | 12 | 10 |

The following vowels are given:

A=22; E=20; I=24; O=12; and U=11.

TABLE 1

| | | | | |
|---|---|---|---|---|
| A 22 | B | C | D | E 20 |
| F | G | H | I 24 | J |
| K | L | M | N | O 12 |
| P | Q | R | S | T |
| U 11 | V | W | Y | Z |

With the vowels given, solver can begin the magic square as shown in Table 1 and fill in the vowels in the cryptogram (single underline). Using complementary pairs for the given numbers one can add the following numbers to the 5 magic square, shown in Table 2: 19 (K), 25 (W), 15 (G), 17 (H), 14 (R), 21 (L). These can then be added to the cryptogram, (double underline).

TABLE 2

| | | | | |
|---|---|---|---|---|
| A 22 | B | C | D 13 | E 20 |
| F 3 8 | G 15 | H 17 | I 24 | J |
| K 19 | L 21 | M 8 3 | N 10 5 | O 12 |
| P 10 | Q | R 14 | S 16 | T 23 |
| U 11 | V 18 | W 25 | Y | Z |

Now studying the cryptogram, it appears that only S=16 will satisfy the first word. Indeed, it appears to satisfy the other two places 16 occurs. Putting S in for 16 (underlined 3 times), the cryptogram is nearly solved.

When 16 is added to Table 2, 4 of the team's 15 numbers are in place; i.e. 20, 17, 19, 16, so V=18. When this is added to Table 2 it appears that T=23. Also, since 20 (E), 15 (G) and 25 (W) are already placed on the "T" player track, either N or Q must be 10. (Obviously Q≠10). When V (18), T (23), N (10) are added to the cryptogram (underlined 4 times), it is obvious that the message must be "Arise fair sun and kill the envious moon", so the following numbers can be added to the magic square: 8 (F), 13 (D), and 3 (M).

The addition of 3 (M) to the middle H permits the magic square to be completed by indexing. Indeed, when 10 (N) was added the H could have been completed because M could only be 3, necessary to make the line total 65. Table 3 shows the complete cryptogram magic square.

TABLE 3

| | | | | |
|---|---|---|---|---|
| A 22 | B 4 | C 6 | D 13 | E 20 |
| F 8 | G 15 | H 17 | I 24 | J 1 |
| K 19 | L 21 | M 3 | N 10 | O 12 |
| P 5 | Q 7 | R 14 | S 16 | T 23 |
| U 11 | V 18 | W 25 | Y 2 | Z 9 |

It is appreciated that the following games may also be played:

1) Head-to-head competition with two boards and two decks or mixed decks.

2) Relay competition with teams.

Magic squares techniques of manipulating magic squares will work with other magic squares to some extent.

The above specification, examples and data provide a complete description of the manufacture and use of the composition of the invention. Since many embodiments of the invention can be made without departing from the spirit and scope of the invention, the invention resides in the claims hereinafter appended.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An educational and recreational apparatus, comprising:

a background grid defining a 5 ×5 matrix having a plurality of individual cells; and a plurality of elements each having a first surface with distinct indicia disposed thereon, said elements being removably disposable on said grid and said elements further including a distinct coloration on said first surface;

wherein an arrangement of said elements disposed on said grid define a magic square so that rows, columns, diagonals and other patterns of the magic square are characterized by a defined relationship in accordance with said distinct indicia and said distinct coloration disposed on said elements, said magic square further defining five groups of five elements; and wherein the five elements of each group have the same distinct colorization, and each group has a different distinct colorization from the other groups.

2. An educational and recreational apparatus according to claim 1 wherein said grid is a game board, defining a substantially square pattern, said game board having a holder for said removably disposable elements.

3. An educational and recreational apparatus according to claim 2 wherein said grid is a vertically disposed game board.

4. An educational and recreational apparatus according to claim 2 wherein said grid is a substantially horizontally disposed game board, whereby in use said game board is disposed on a substantially flat surface.

5. An educational and recreational apparatus according to claim 2 wherein said grid is an electronic game apparatus.

6. An educational and recreational apparatus according to claim 1, wherein the arrangement of said elements on said magic square is determined by a general formula.

7. An educational and recreational apparatus according to claim 1, wherein each row of said magic square is defined by said distinctly colored elements whereby each of said elements in the row include the same color, and each row of said magic square is characterized by said defined relationship in accordance with said indicia.

8. An educational and recreational apparatus according to claim 1, wherein each column of said magic square is defined by said distinctly colored elements whereby each of said elements in the column include the same color, and each column of said magic square is characterized by said defined relationship in accordance with said indicia.

9. An educational and recreational apparatus according to claim 1, wherein each diagonal of said magic square is defined by said distinctly colored elements whereby each of said elements in the diagonal include the same color, and each diagonal of said magic square is characterized by said defined relationship in accordance with said indicia.

10. An educational and recreational apparatus according to claim 1, wherein a plurality of geometric patterns are defined by said distinctly colored elements forming said magic square, whereby each of said underlying geometric pattern is characterized by said defined relationship in accordance with said indicia.

11. An educational and recreational apparatus according to claim 10, wherein at least one of said geometric pattern forming said magic square is a cross shaped pattern.

12. An educational and recreational apparatus according to claim 10, wherein at least one of said geometric pattern forming said magic square is a diagonal cross shaped pattern.

13. An educational and recreational apparatus according to claim 1, wherein each element further comprises a player member and a team member.

14. An educational and recreational apparatus according to claim 1, wherein the plurality of elements are arranged to form player tracks and team tracks.

15. An educational and recreational apparatus according to claim 14, wherein the magic square is constructed using indexing by establishing the order of said players on said team tracks.

16. An educational and recreational apparatus according to claim 1, wherein the elements of the magic square are arranged to form identifying fields and mixed magic squares.

17. An educational and recreational apparatus according to claim 1, wherein an arrangement of said elements in rows, columns, diagonals and other patterns is manipulated using one of a team switch, player switch and cross switch to change the magic square.

18. An educational and recreational apparatus according to claim 1, wherein said magic square is formed by a method of using complementary pairs and branching.

19. An educational and recreational apparatus according to claim 1, wherein said magic square is manipulated by one of a number switch for changing one pattern into another; rolling a pattern; changing fields into mixed magic squares and vice versa; and changing any predetermined pattern into another predetermined pattern.

20. An educational and recreational apparatus according to claim 19, wherein said predetermined pattern is one of a cross(+), exe(x) and straight line.

21. A method of manipulating elements arranged in a grid defining a 5×5 matrix, each of said elements having a first surface with distinct indicia disposed thereon, said elements being removably disposable on said grid and said elements further including a distinct coloration on said first surface, the method comprising:

arranging said elements on said grid;

manipulating said elements on said grid; and forming a magic square on said grid in accordance with said distinct indicia and distinct coloration disposed on said elements;

wherein said magic square is characterized by a defined relationship in accordance with said distinct indicia and said distinct coloration, said magic square further defining five groups of five elements, and wherein the five elements of each group have the same distinct colorization, and each group has a different distinct colorization from the other groups.

22. A method of manipulating elements arranged in a grid in accordance with claim 21 further comprising:

forming a plurality of magic squares on said matrix by further manipulating and arranging said elements for defining distinct geometric patterns;

wherein each distinct geometric pattern is characterized by said defined relationship in accordance with said distinct indicia and distinct coloration disposed on said elements.

23. A method of manipulating elements arranged in a grid in accordance with claim 21 further comprising:

timing the duration of said manipulation of said elements while forming said distinct geometric pattern.

24. A method in accordance with claim 23 further comprising:

scoring points for said manipulation of said elements while forming at least one of said distinct geometric pattern based on said time duration required to perform the manipulation.

25. A method of manipulating elements arranged in a grid defining a 5×5 matrix, each of said elements having a first surface with distinct indicia disposed thereon, said elements being removably disposable on said grid, and said elements further including a distinct coloration on said first surface, said method being operable on at least one computer system having at least one display device, at least one input device, at least one data storage device, and at least one calculation means, the method comprising:

displaying a grid defining a matrix on said display device;

arranging said elements on said grid using said input device to select and insert said elements therein;

manipulating said elements on said grid using said input device; and forming a magic square on said matrix by arranging said elements, said magic square further defining five groups of five elements; and wherein the five elements of each group have the same distinct colorization, and each group has a different distinct colorization from the other groups.

26. A method in accordance with claim 25, further comprising:

repositioning said elements on said grid in response to said input device;

forming a plurality of magic squares by arranging said elements to define distinct geometric patterns whereby each distinct geometric pattern is characterized by said defined relationship in accordance with said indicia.

27. A method in accordance with claim 26, further comprising:

verifying said magic square whereby said calculation means verifies that said defined relationship in accordance with indicia is satisfied.

28. A method in accordance with claim 27, further comprising:

timing the duration of said manipulation of said elements while forming said distinct geometric pattern.

29. A method in accordance with claim 28, further comprising:

scoring points for said manipulation of said elements while forming said distinct geometric pattern based on said time duration required to perform said manipulation.

30. An article of manufacture comprising a computer program readable by at least one computer system and embodying one or more instructions executable by the at least one computer system to perform a method for performing a magic squares computer game on the at least one computer system, the at least one computer system having at least one display device, at least one input device, and at least one data storage device, the method comprising:

displaying a grid defining a matrix on said display device;

arranging said elements on said grid;

manipulating said elements on said grid; and forming a magic square on said matrix, said magic square further defining five groups of five elements; and wherein the five elements of each group have the same distinct colorization, and each group has a different distinct colorization from the other groups.

31. An article of manufacture according to claim 30, the method further comprising:

repositioning said elements on said grid in response to said input device; and forming a plurality of magic squares by arranging said elements to define distinct geometric patterns whereby each distinct geometric pattern is characterized by said defined relationship in accordance with said indicia.

32. An article of manufacture according to claim 31, the method further comprising:

verifying said magic square whereby said calculation means verifies that said defined relationship in accordance with indicia is satisfied.

33. An article of manufacture according to claim 32, the method further comprising:

timing the duration of said manipulation of said elements while forming said distinct geometric pattern.

34. An article of manufacture according to claim 33, the method further comprising:

scoring points for said manipulation of said elements while forming said distinct geometric pattern based on said time duration.

* * * * *